(12) United States Patent
Taoki

(10) Patent No.: US 10,291,836 B2
(45) Date of Patent: May 14, 2019

(54) IMAGING APPARATUS FOR PRESET TOURING FOR TOUR-ROUTE SETTING

(71) Applicant: CANON KABUSHIKI KAISHA, Tokyo (JP)

(72) Inventor: Shinya Taoki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 228 days.

(21) Appl. No.: 14/920,769

(22) Filed: Oct. 22, 2015

(65) Prior Publication Data
US 2016/0127635 A1  May 5, 2016

(30) Foreign Application Priority Data

Oct. 29, 2014  (JP) ................................ 2014-220844

(51) Int. Cl.
*H04N 7/18* (2006.01)
*H04N 5/232* (2006.01)

(52) U.S. Cl.
CPC ..... *H04N 5/23206* (2013.01); *H04N 5/23216* (2013.01); *H04N 7/183* (2013.01)

(58) Field of Classification Search
CPC . H04N 5/23206; H04N 5/23216; H04N 7/183
USPC ........................................................ 348/143
See application file for complete search history.

(56) References Cited

U.S. PATENT DOCUMENTS

| | | | |
|---|---|---|---|
| 9,508,263 B1* | 11/2016 | Teng | B64C 39/024 |
| 2002/0118969 A1* | 8/2002 | Kanade | G03B 41/00 |
| | | | 396/322 |
| 2005/0237388 A1* | 10/2005 | Tani | G08B 13/19695 |
| | | | 348/143 |
| 2005/0285950 A1* | 12/2005 | Oya | G01S 3/7864 |
| | | | 348/211.4 |
| 2006/0197839 A1* | 9/2006 | Senior | H04N 5/232 |
| | | | 348/169 |
| 2008/0284862 A1* | 11/2008 | Kogane | H04N 5/23203 |
| | | | 348/211.8 |
| 2009/0174771 A1* | 7/2009 | Royz | G06T 15/20 |
| | | | 348/143 |

(Continued)

FOREIGN PATENT DOCUMENTS

| | | |
|---|---|---|
| CN | 101390130 A | 3/2009 |
| CN | 102710892 A | 10/2012 |

(Continued)

*Primary Examiner* — Marnie A Matt
(74) *Attorney, Agent, or Firm* — Cannon U.S.A., Inc. IP Division

(57) ABSTRACT

An apparatus includes at least one imaging unit, a change unit configured to change an imaging position at which the imaging unit performs an imaging operation, a storage unit configured to store a plurality of tour conditions each including the imaging position, a control unit configured to control the change unit based on the plurality of tour conditions, and a priority order setting unit configured to set, based on a predetermined priority order, a tour condition to be used for the control of the change unit. Each of the plurality of tour conditions further includes a period for controlling the change unit, and the priority order setting unit automatically sets a tour condition to be performed in a case where the plurality of tour conditions overlaps each other in the period for controlling the change unit.

18 Claims, 23 Drawing Sheets

(56) References Cited

U.S. PATENT DOCUMENTS

| | | | | |
|---|---|---|---|---|
| 2011/0149072 A1* | 6/2011 | McCormack | G08B 13/1963 | 348/143 |
| 2011/0157389 A1* | 6/2011 | McClellan | H04N 5/232 | 348/222.1 |
| 2011/0228086 A1* | 9/2011 | Cordero | G08B 13/19636 | 348/143 |
| 2012/0154593 A1* | 6/2012 | Anderson | H04N 5/222 | 348/157 |
| 2012/0243730 A1* | 9/2012 | Outtagarts | G06K 9/00771 | 382/103 |
| 2013/0201316 A1* | 8/2013 | Binder | H04L 67/12 | 348/77 |
| 2014/0186052 A1* | 7/2014 | Oshima | H04B 10/1143 | 398/130 |
| 2014/0362246 A1* | 12/2014 | Nakano | H04N 5/247 | 348/211.4 |
| 2015/0264267 A1* | 9/2015 | Park | H04N 5/23293 | 348/333.02 |
| 2016/0150193 A1* | 5/2016 | Niida | H04N 7/181 | 348/143 |

FOREIGN PATENT DOCUMENTS

| | | |
|---|---|---|
| CN | 202798913 U | 3/2013 |
| JP | 2012-19285 A | 1/2012 |
| WO | 2014/208073 A1 | 12/2014 |

* cited by examiner

FIG.4A

| route1 | PRESET NAME | MOVING SPEED (PT) | MOVING SPEED (Z) | PAUSE DURATION (SEC) |
|---|---|---|---|---|
| 1 | P1 | 20 | 8 | 10 |
| 2 | P2 | 20 | 8 | 8 |
| 3 | P3 | 20 | 8 | 7 |
| 4 | P4 | 20 | 8 | 15 |
| 5 | P5 | 20 | 8 | 30 |

FIG.4B

| route2 | PRESET NAME | MOVING SPEED (PT) | MOVING SPEED (Z) | PAUSE DURATION (SEC) |
|---|---|---|---|---|
| 1 | P2 | 20 | 8 | 20 |
| 2 | P3 | 20 | 8 | 25 |
| 3 | P4 | 20 | 8 | 15 |

FIG.5

TOUR ROUTE SETTINGS

ROUTE LIST: *5001*

| ROUTE NAME | VALID CONDITION | TIME PERIOD | REVERSE |
|---|---|---|---|
| route1 | ALWAYS | 17:00 – 18:00 | NOT REQUIRED |
| route2 | ALWAYS | – | NOT REQUIRED |
| route3 | NOT USED | – | NOT REQUIRED |
| route4 | NOT USED | – | NOT REQUIRED |
| route5 | NOT USED | – | NOT REQUIRED |

ROUTE NAME (HALF-WIDTH ALPHANUMERIC): *5002*
[ route1 ]

ROUTE NAME (JAPANESE):
[          ]

VALID CONDITION: [ ALWAYS ] *5003*

☑ DESIGNATE TIME PERIOD *5004*   START TIME: [ 17:00 ] *5005*   END TIME: [ 18:00 ] *5006*

☐ REVERSE ROUTE *5007*

[ RETURN SETTINGS ] *5008*   [ STORE SETTINGS ] *5009*

*5000*

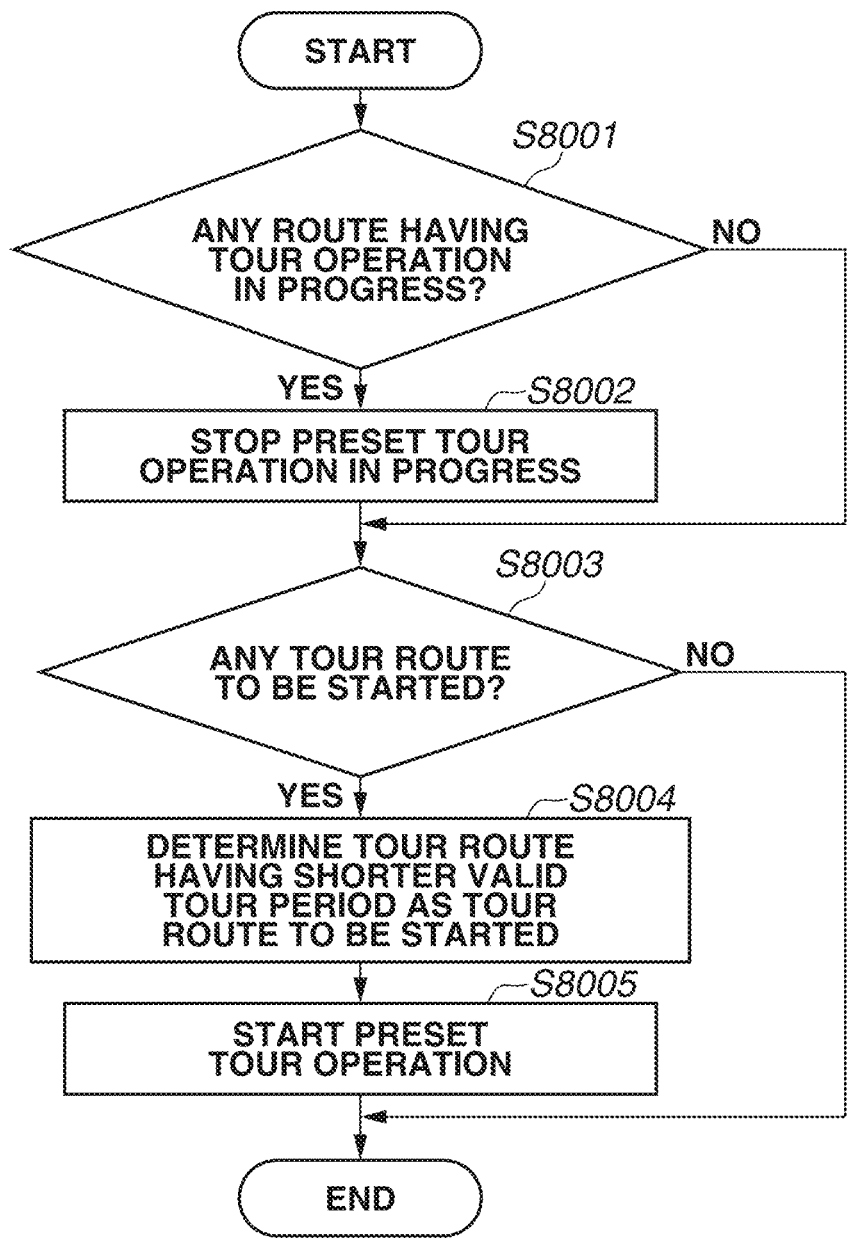

FIG.21

|  | VALID CONDITION | TIME PERIOD | CAMERA COOPERATION | ROLE OF CAMERA IN COOPERATION |
|---|---|---|---|---|
| Route1 | FOR VIEWERS | 8:00 – 17:00 | ○ | CLIENT |
| Route2 | FOR VIEWERS | 16:00 – 19:00 | ○ | HOST |

※ : PRESET POSITIONS OF TOUR ROUTE 1
▲ : PRESET POSITIONS OF TOUR ROUTE 2
○ : PRESET POSITIONS OF TOUR ROUTE 3

FIG.23

| | VALID CONDITION | TIME PERIOD | CAMERA COOPERATION | NUMBER OF REGISTERED PRESET POSITIONS | TIME (SEC) REQUIRED IN ONE CYCLE |
|---|---|---|---|---|---|
| Route1 | ALWAYS | 8:00 – 20:00 | X | 13 | 360 |
| Route2 | ALWAYS | 17:00 – 18:00 | X | 3 | 15 |
| Route3 | ALWAYS | 17:00 – 18:00 | X | 5 | 30 |

IMAGING APPARATUS FOR PRESET TOURING FOR TOUR-ROUTE SETTING

BACKGROUND OF THE INVENTION

Field of the Invention

The present invention relates to an imaging apparatus, and more particularly to a monitoring camera that performs a tour operation.

Description of the Related Art

There is known a conventional technique that allows, in a tour route including a plurality of predetermined imaging positions, an imaging apparatus to capture video images by moving the imaging direction thereof.

For example, Japanese Patent Application Laid-Open No. 2012-19285 discusses an imaging apparatus that allows, in a single tour route, video images to be captured at the predetermined imaging positions to which the imaging apparatus can move the imaging direction thereof.

However, the above-mentioned conventional technique discussed in Japanese Patent Application Laid-Open No. 2012-19285 relates to a single tour route. Japanese Patent Application Laid-Open No. 2012-19285 does not mention a case where a plurality of tour routes can be set or a case where a plurality of tour routes overlaps each other in tour operation period.

Therefore, when a plurality of tour routes is to be set, a user needs to set their respective tour operations so as not to overlap each other to avoid the occurrence of an abnormality. Accordingly, there arises a problem that the setting of the respective tour operations is troublesome and difficult for the user.

SUMMARY OF THE INVENTION

According to an aspect of the present invention, an apparatus includes at least one imaging unit, a change unit configured to change an imaging position at which the imaging unit performs an imaging operation, a storage unit configured to store a plurality of tour conditions each including the imaging position, a control unit configured to control the change unit based on the plurality of tour conditions, and a priority order setting unit configured to set, based on a predetermined priority order, a tour condition to be used for the control of the change unit. Each of the plurality of tour conditions further includes a period for controlling the change unit, and the priority order setting unit automatically sets a tour condition to be performed in a case where the plurality of tour conditions overlaps each other in the period for controlling the change unit.

Further features of the present invention will become apparent from the following description of exemplary embodiments with reference to the attached drawings.

BRIEF DESCRIPTION OF THE DRAWINGS

FIGS. 4A and 4B each illustrate a setting example for a preset tour operation to be performed by the monitoring camera according to the first exemplary embodiment.

FIG. 5 illustrates a camera control application graphical user interface (GUI) to be displayed by the client apparatus according to the first exemplary embodiment.

FIG. 8 is a flowchart illustrating a series of preset tour (start and stop) operations according to a second exemplary embodiment of the present invention.

FIG. 21 illustrates settings for tour routes, illustrated in FIG. 20, in the preset tour operations according to the sixth exemplary embodiment.

FIG. 23 illustrates settings for the tour routes illustrated in FIG. 22 in the preset tour operations according to the sixth exemplary embodiment of the present invention.

DESCRIPTION OF THE EMBODIMENTS

Exemplary embodiments of the present invention will be described in detail below with reference to the attached drawings. Configurations illustrated in the following exemplary embodiments are mere examples. The present invention is not limited to the illustrated configurations.

Hereinafter, a configuration of a system, in which communication is performed via a network, according to a first exemplary embodiment of the present invention will be described in detail below with reference to FIGS. 1A and 1B.

Figure 1A:
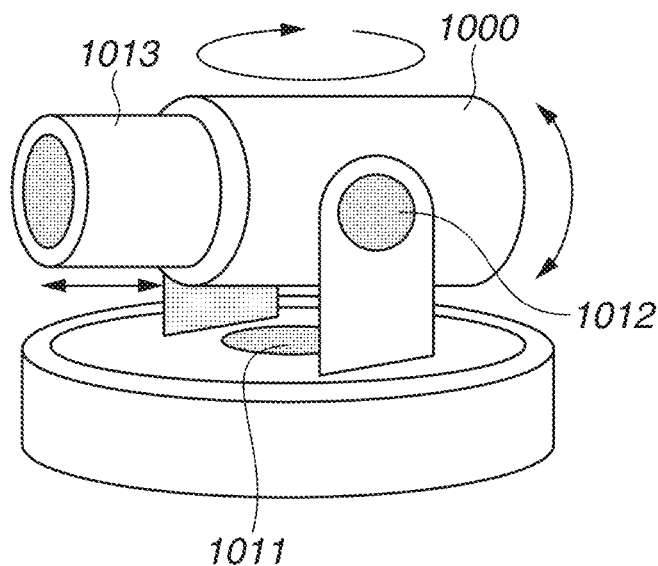
FIG. 1A illustrates a configuration of a monitoring camera according to a first exemplary embodiment of the present invention.

FIG. 1A illustrates a monitoring camera 1000 according to the present exemplary embodiment.

A pan drive mechanism 1011 changes the imaging direction of the monitoring camera 1000 in a pan direction. In the present exemplary embodiment, the pan drive mechanism 1011 can turn the imaging direction of the monitoring camera 1000 by 360°. The pan drive mechanism 1011 can also perform a turning operation of more than 360°.

A tilt drive mechanism 1012 changes the imaging direction of the monitoring camera 1000 in a tilt direction. The tilt drive mechanism 1012 can rotate the monitoring camera 1000 in the range from 0° (horizontal direction) to 180°. When the rotational angle of the monitoring camera 1000 exceeds 90°, the tilt drive mechanism 1012 performs an image rotating operation (e.g., performs image processing) to prevent a captured image from being turned upside down.

A zoom mechanism 1013 drives an optical lens of the monitoring camera 1000 to change an imaging angle of view. In the present exemplary embodiment, although a zoom operation is performed by driving the optical lens, it may be performed by an electronic method that extracts a part of a captured image. The monitoring camera 1000 according to the present exemplary embodiment corresponds to an imaging apparatus.

Figure 1B:
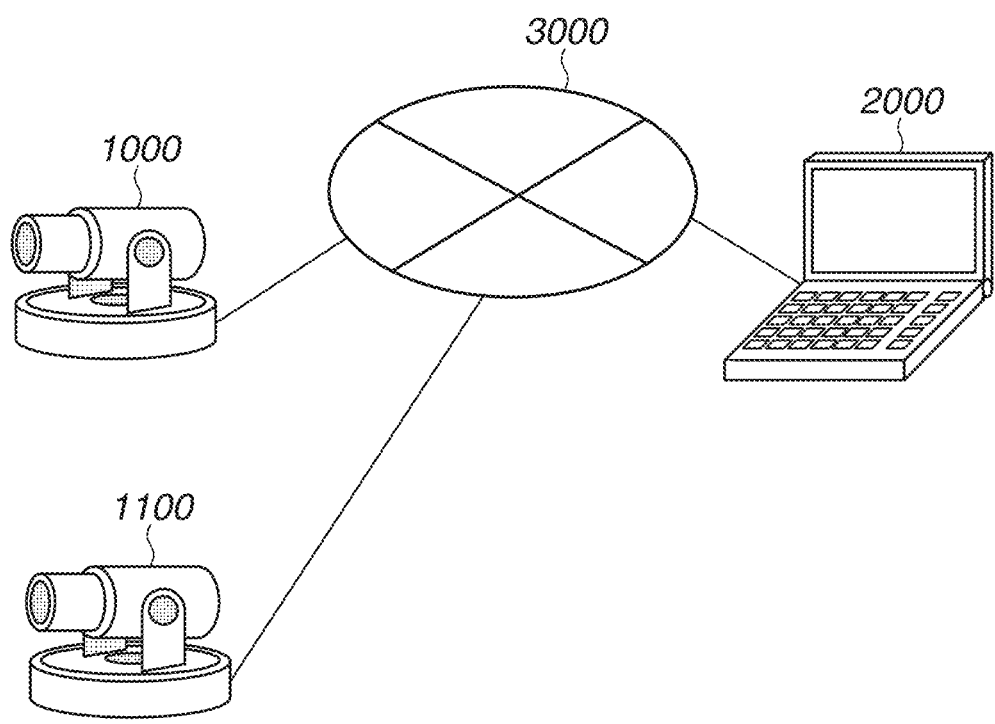
FIG. 1B illustrates a configuration of a monitoring system including the monitoring camera according to the first exemplary embodiment.

FIG. 1B illustrates a configuration of a monitoring system including the monitoring camera 1000. A client apparatus 2000 is an external device according to the present exemplary embodiment. The monitoring camera 1000, another monitoring camera 1100, and the client apparatus 2000 are mutually connected via a network 3000 so that they can communicate with each other. The client apparatus 2000 transmits various commands to the monitoring camera 1000. The monitoring camera 1000 transmits responses to the commands to the client apparatus 2000. The client apparatus 2000 according to the present exemplary embodiment is an example of an external apparatus such as a personal computer (PC). The monitoring system according to the present exemplary embodiment corresponds to an imaging system. The monitoring camera 1000 and the monitoring camera 1100 are similar to each other in configuration. Therefore, the redundant description thereof will be avoided. Further, the monitoring system according to the present exemplary embodiment may include a plurality of monitoring cameras in addition to the monitoring cameras 1000 and 1100.

Further, the network 3000 can be constituted by a plurality of routers, switches, and cables that comply with a communication standard such as Ethernet (registered trademark). However, in the present exemplary embodiment, any other network may be used as long as it can realize communication between the monitoring camera 1000 and the client apparatus 2000, regardless of communication standard, scale, or configuration.

For example, the network 3000 may be constituted by the Internet, a wired local area network (LAN), a wireless LAN, or a wide area network (WAN). The monitoring camera 1000 according to the present exemplary embodiment may be configured to comply with, for example, Power over Ethernet (PoE) (registered trademark) and receive electric power via a LAN cable.

Figure 2:
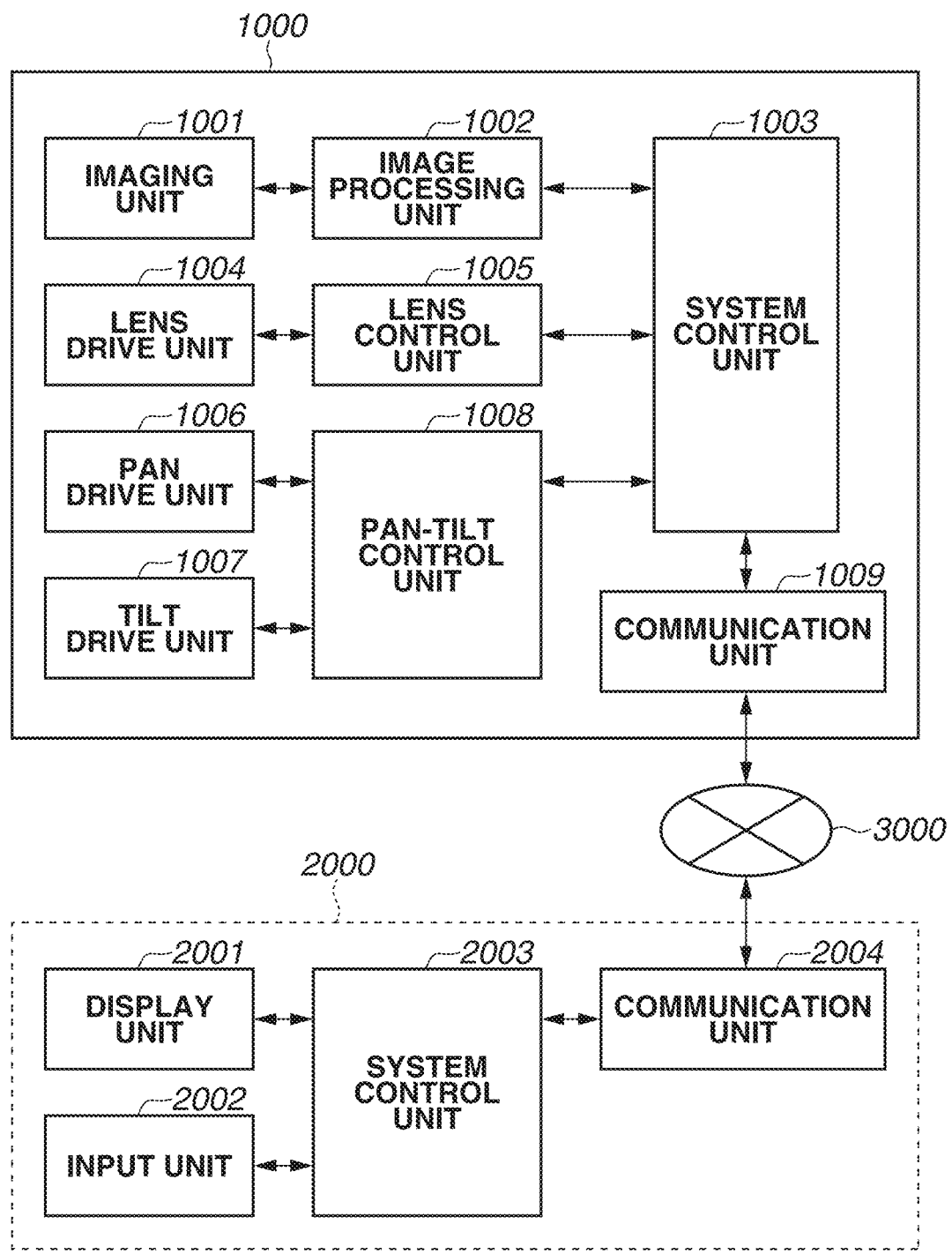
FIG. 2 is a diagram illustrating a functional block configuration and a system configuration of a monitoring system including the monitoring camera and a client apparatus according to the first exemplary embodiment.

FIG. 2 is a diagram illustrating a functional block configuration and a system configuration of the monitoring system including the monitoring camera 1000 and the client apparatus 2000 according to the present exemplary embodiment. The monitoring system illustrated in FIG. 2 includes the monitoring camera 1000, the client apparatus 2000, and the network 3000. The monitoring camera 1000 includes an imaging unit 1001, an image processing unit 1002, a system control unit 1003, a lens drive unit 1004, and a lens control unit 1005. Further, the monitoring camera 1000 includes a pan drive unit 1006, a tilt drive unit 1007, a pan-tilt control unit 1008, and a communication unit 1009. The client apparatus 2000 includes a display unit 2001, an input unit 2002, a system control unit 2003, and a communication unit 2004. The monitoring camera 1000 and the client apparatus 2000 are mutually connected to be able to communicate with each other via the network 3000.

Configurations and functions of the above units of the monitoring camera 1000 will be described in detail below with reference to FIG. 2.

The imaging unit 1001 is constituted by a lens portion and an image sensor (e.g., a charge coupled device (CCD) or a complementary metal oxide semiconductor (CMOS)), and captures an image of an object according to the angle of view determined based on lens settings, and converts the captured image into an electric signal.

The image processing unit 1002 generates image data by performing predetermined image processing and compression coding processing on the signal obtained when the imaging unit 1001 captures and photoelectrically convert an image. The monitoring camera 1000 according to the present exemplary embodiment controls the imaging unit 1001 and the image processing unit 1002 based on imaging conditions that are set by the client apparatus 2000 or automatically determined by the monitoring camera 1000. The imaging conditions include an imaging gain condition, a gamma condition, a dynamic range condition, an exposure condition, and a focus condition.

The system control unit 1003 analyzes a camera control command received from the client apparatus 2000 via the network 3000, and performs processing according to the command. For example, the system control unit 1003 instructs the image processing unit 1002 to perform image quality adjustment, instructs the lens control unit 1005 to perform zoom and focus control, or instructs the pan-tilt control unit 1008 to perform pan and tilt operations. Further, the system control unit 1003, which includes a central processing unit (CPU), comprehensively controls the components of the monitoring camera 1000 and sets various parameters. Further, the system control unit 1003 includes a memory capable of electrically erasing data, and executes programs stored in the memory. The memory is usable as a storage area for a program to be executed by the system control unit 1003, a work area to be used while a program is executed, and a data storage area.

The lens drive unit 1004 drives the lens portion of the imaging unit 1001 under the control of the lens control unit 1005. The lens portion of the imaging unit 1001 includes a driving system (e.g., a zoom mechanism, a focus mechanism, an anti-vibration mechanism, a diaphragm mechanism, and a shutter mechanism) and a motor serving as a drive source of the driving system. The system control unit 1003 sets and controls the setting values and conditions for the lens control to be performed by the lens control unit 1005.

The lens drive unit 1004 drives a focus lens and a zoom lens. The lens control unit 1005 controls operations of the focus lens and the zoom lens.

Each of the pan drive unit 1006 and the tilt drive unit 1007 is constituted by a mechanical drive system including a gear mechanism (not illustrated) for performing a pan or tilt operation, and a stepping motor serving as a drive source thereof. The pan-tilt control unit 1008 controls a driving amount, a driving direction, a driving speed, a driving acceleration and the like in the operation of changing the orientation of the lens. The system control unit 1003 sets and controls the setting values and conditions for the pan and tilt control to be performed by the pan-tilt control unit 1008.

The communication unit 1009 distributes data of a captured image to the client apparatus 2000 via the network 3000. Further, the communication unit 1009 receives a camera control command transmitted from the client apparatus 2000, and performs appropriate packet processing to transmit the command to the system control unit 1003. Further, the communication unit 1009 transmits a response to the received command to the client apparatus 2000.

Subsequently, configurations and functions of the above units of the client apparatus 2000 will be described in detail below with reference to FIG. 2.

A general computer (e.g., a personal computer) is typically used as the client apparatus 2000.

The display unit 2001 includes a liquid crystal display device, and displays an image acquired from the monitoring camera 1000 and a graphical user interface (hereinafter, referred to as GUI) for controlling the monitoring camera 1000.

The input unit 2002 includes a pointing device such as a keyboard, a mouse, or a touch panel. A user of the client apparatus 2000 operates the GUI via the input unit 2002.

The system control unit 2003 generates a camera control command according to a user's GUI operation, and transmits the generated command to the monitoring camera 1000 via the communication unit 2004. Further, the system control unit 2003 also displays on the display unit 2001 image data received from the monitoring camera 1000 via the communication unit 2004. Further, the system control unit 2003, which includes a CPU, comprehensively controls the components of the client apparatus 2000 and sets various parameters. Further, the system control unit 2003 includes a memory capable of electrically erasing data and executes programs stored in the memory. The memory is usable as a storage area for a program to be executed by the system control unit 2003, a work area to be used while a program is executed, and a data storage area.

The communication unit 2004 receives image data from the monitoring camera 1000 via the network 3000. Further, the communication unit 2004 transmits a camera control command to the monitoring camera 1000 and receives a response to the command.

As mentioned above, the client apparatus 2000 can acquire images captured by the monitoring camera 1000 via the network 3000 and can perform various types of camera control.

Hereinafter, a tour control operation to be performed by the monitoring camera 1000 according to the present exemplary embodiment will be described in detail below with reference to FIGS. 3 to 5.

Figure 3:
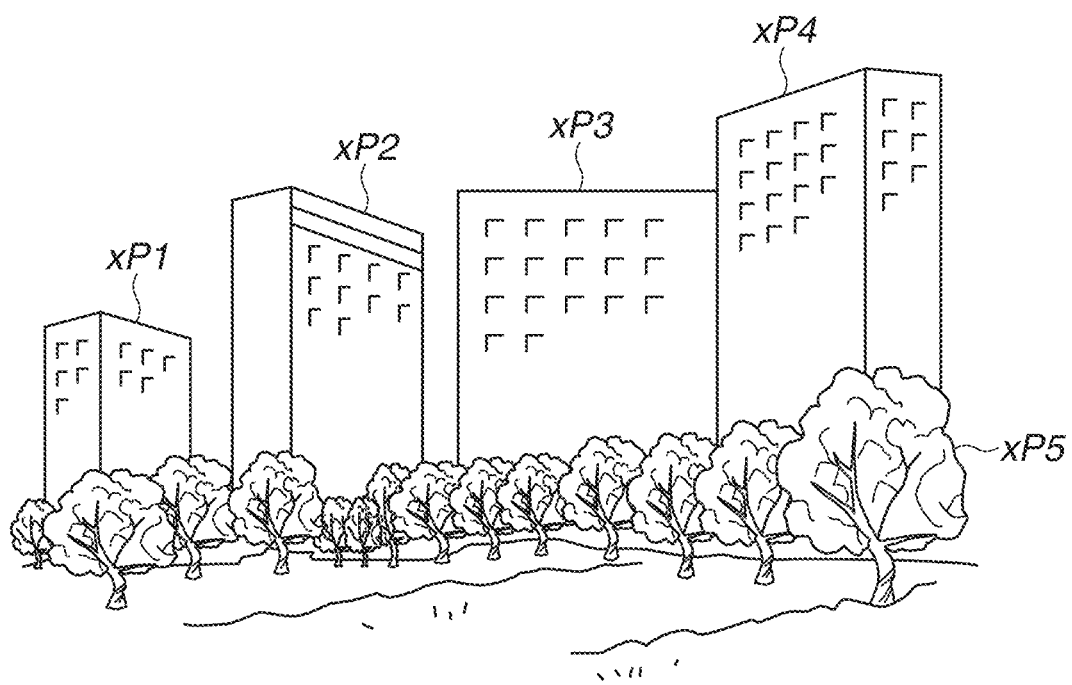
FIG. 3 illustrates an example of a panoramic image captured by the monitoring camera according to the first exemplary embodiment.

FIG. 3 illustrates a partial area of an object that can be captured by the monitoring camera 1000. Each point X illustrated in FIG. 3 is a preset position at which the monitoring camera 1000 performs a tour operation. In the present exemplary embodiment, the preset position is a combination of a pan position and a tilt position as an imaging direction, and/or a zoom position as an imaging angle of view, which has been preset by a user. The preset position is stored in the memory in the system control unit 1003 or the system control unit 2003. In the present exemplary embodiment, five preset positions P1 to P5 are assumed to be registered. The preset positions P1 to P5 according to the present exemplary embodiment correspond to imaging position information. Further, the preset position may include information indicating which camera is selected from a plurality of monitoring cameras. Including this information allows an image to be captured in the range intended by a user.

FIGS. 4A and 4B each illustrate an example of tour conditions for a tour route, in which the registered preset positions, the tour order of the preset positions, and the tour conditions (e.g., moving speed and pause duration) are associated with one another.

FIG. 4A illustrates an example of a tour route that specifies continuing the tour operation of the five preset positions P1, P2, P3, P4, and P5 in the order of P1, P2, P3, P4, and P5. Here, returning to P1 after P5 to repeat the movement between the specific imaging positions can be specified.

FIG. 4B illustrates an example of a tour route that specifies continuing the tour operation of the three preset positions P2, P3, and P4 in the order of P2, P3, and P4. Here, returning to P2 after P4 to repeat the movement between the specific imaging positions can be specified. Although FIGS. 4A and 4B illustrate the tour conditions for the specific monitoring camera 1000, an additional condition for switching between a plurality of imaging apparatuses may be included therein. In this case, an additional column for selecting a monitoring camera may be provided to enable a user to designate the monitoring camera to be set. Further, in a case where the operation of sequentially switching a plurality of monitoring cameras is performed, it is unnecessary to change and control the respective pan positions, tilt positions, and zoom positions of the imaging apparatuses. Although FIGS. 4A and 4B illustrate the tour conditions for the pan, tilt, and zoom operations of the specific monitoring camera 1000, if the monitoring camera 1000 is mounted on a movable robot, the tour conditions may include a monitoring position (i.e., the position of the robot). In this case, an additional column for designating the monitoring position of the monitoring camera 1000 may be provided to enable a user to designate the monitoring position to be set. The monitoring position may be expressed by any GPS value or expressed as a relative position in relation to a designated origin position.

FIG. 5 illustrates an example of a camera control application GUI to be displayed on the display unit 2001 of the client apparatus 2000 according to the present exemplary embodiment. A GUI 5000 includes a route setting list 5001 of routes, an input field 5002 usable to input a tour route name, and an input field 5003 usable to designate a valid condition for a tour route. The GUI 5000 further includes a checkbox 5004 usable to designate a time period, an input field 5005 usable to designate a start time, and an input field 5006 usable to designate an end time (or stop time). The GUI 5000 further includes a checkbox 5007 usable to designate a route reversed to perform a tour operation in a reverse order, a button 5008 operable to clear setting changes before being stored, and a button 5009 operable to store setting changes. The GUI 5000 is displayed on the display unit 2001 of the client apparatus 2000 and is operated by a user via the input unit 2002. In the present exemplary embodiment, the valid condition for a tour route settable in the input field 5003 can be selected from three options, "always", "for viewers", and "not used". Each tour route is started in the corresponding one of the valid conditions. If the checkbox 5004 is ticked, and a start time and an end time are input in the input fields 5005 and 5006, respectively, a preset tour operation is repeated during a period from the start time in the input field 5005 to the end time in the input field 5006. In the present exemplary embodiment, "route1" in the route setting list 5001 corresponds to the tour route illustrated in FIG. 4A, and "route2" corresponds to the tour route illustrated in FIG. 4B. The listing order of tour routes can be changed in the route setting list 5001 as appropriate.

A flow of preset tour start and stop operations to be performed by the monitoring camera 1000 according to the present exemplary embodiment will be described in detail below with reference to FIG. 6. The system control unit 1003 performs the processing of the flowchart illustrated in FIG. 6.

Figure 6:
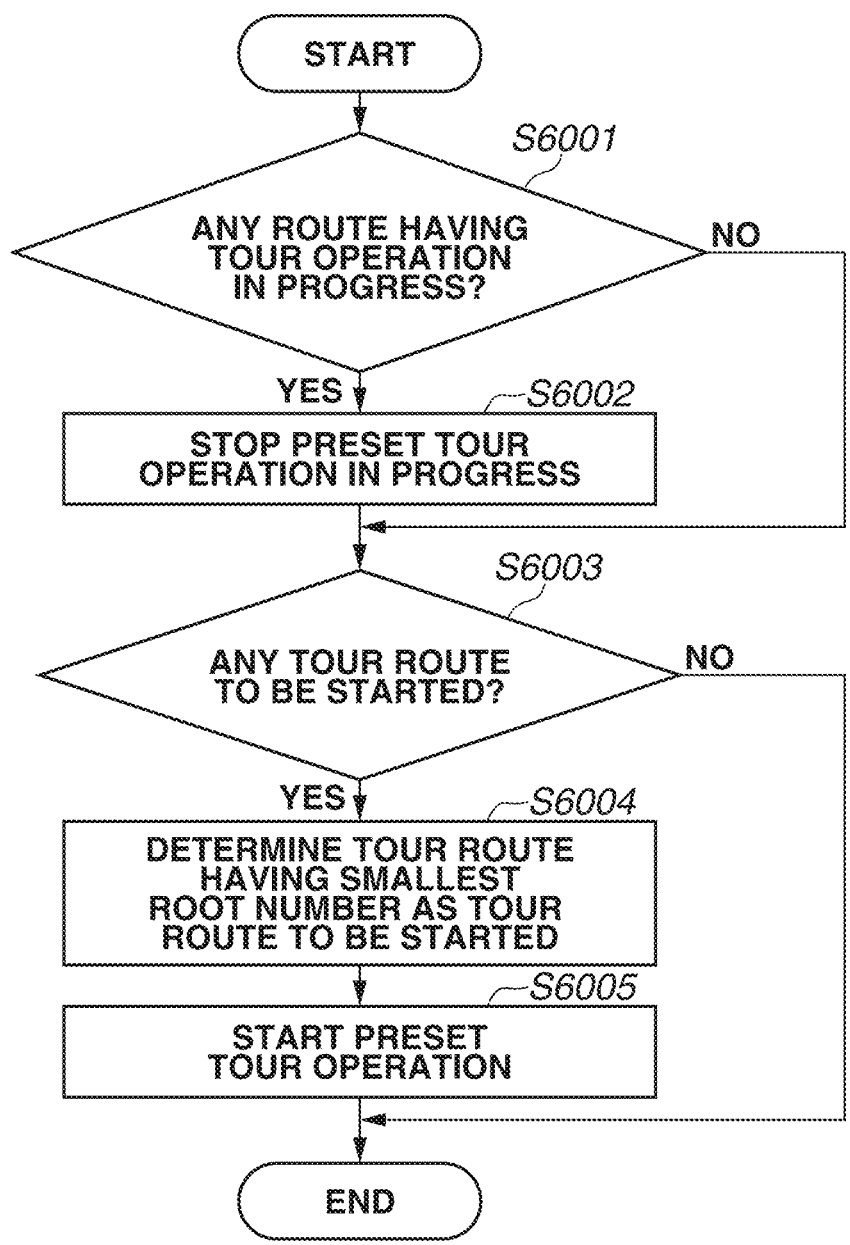
FIG. 6 is a flowchart illustrating a series of preset tour (start and stop) operations according to the first exemplary embodiment.

The system control unit 1003 starts the processing of the flowchart illustrated in FIG. 6 in response to arrival of a tour start time, in response to receipt of a tour start trigger, in response to arrival of a tour end time, or in response to receipt of a tour stop trigger. Further, the system control unit 1003 starts or stops a tour operation in response to establishment of a video connection with a client, in response to disconnection of the video connection, or in response to a change made to preset tour settings via the GUI 5000 illustrated in FIG. 5. The start/stop trigger according to the present exemplary embodiment is transmitted from the client apparatus 2000. The monitoring camera 1000 receives the trigger signal via the network 3000.

In step S6001, the system control unit 1003 checks whether there is a tour route of which preset tour operation is currently in progress. As the check result, if there is a tour route of which preset tour operation is currently in progress (Yes in step S6001), the operation proceeds to step S6002. On the other hand, if there is no tour route of which preset tour operation is currently in progress (No in step S6001), the operation proceeds to step S6003.

In step S6002, the system control unit 1003 temporarily stops the preset tour operation in progress. Then, the operation proceeds to step S6003.

In step S6003, the system control unit 1003 checks whether there is a tour route that needs to be started. If there is a tour route that needs to be started (Yes in step S6003), the operation proceeds to step S6004. On the other hand, if there is no tour route that needs to be started (No in step S6003), the system control unit 1003 ends the processing of the flowchart illustrated in FIG. 6.

In step S6004, in a case where there is a plurality of tour routes that needs to be started, the system control unit 1003 determines a tour route having a higher priority order as the tour route to be started. More specifically, in the present exemplary embodiment, the system control unit 1003 determines the tour route having the smallest route number as the tour route to be automatically started. In the present exemplary embodiment, the route number indicates the display order of each route included in the route setting list 5001 in the GUI 5000. Then, the operation proceeds to step S6005.

In step S6005, the system control unit 1003 preferentially starts the preset tour operation of the tour route determined in step S6004. In the present exemplary embodiment, the route number to be referred to in determining the priority order corresponds to the setting order in setting of tour conditions.

Next, the behavior of the monitoring camera 1000 according to the present exemplary embodiment exhibits in the preset tour operations in a case where the monitoring camera 1000 performs the processing illustrated in FIG. 6 will be described in detail below with reference to FIGS. 7A to 7D.

When a user sets a tour route via the GUI 5000 illustrated in FIG. 5, the monitoring camera 1000 performs a tour operation according to the conditions set in the route setting list 5001. As an example, the monitoring camera 1000 performs the tour operation of Route1 during the period from 17:00 to 18:00, and performs the tour operation of Route2 all the time.

Figure 7A:
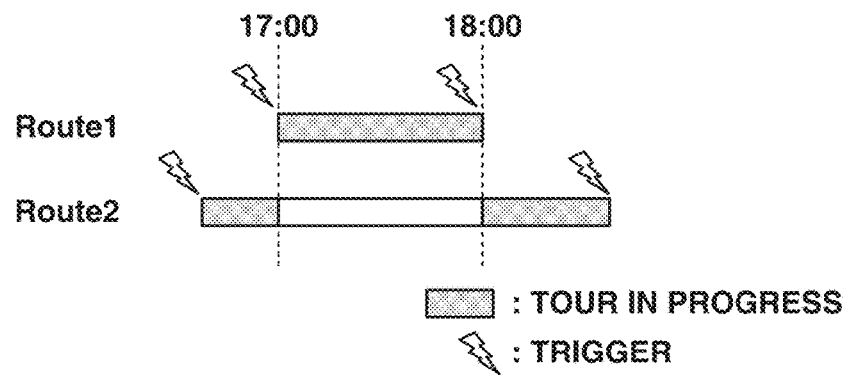
FIGS. 7A, 7B, 7C, and 7D illustrate examples of behavior of the monitoring camera in the preset tour operations according to the first exemplary embodiment.

FIG. 7A illustrates an example of the operating state in a case where the monitoring camera 1000 receives a tour start trigger for the tour operation of Route1 while performing the tour operation of Route2. In response to receiving the tour start trigger for the tour operation of Route1, the monitoring camera 1000 stops the tour operation of Route2 and starts the tour operation of Route1 according to the processing of the flowchart illustrated in FIG. 6. Then, in response to receiving a tour stop trigger for the tour operation of Route1, the monitoring camera 1000 stops the tour operation of Route1 and starts the tour operation of Route2 according to the processing of the flowchart illustrated in FIG. 6. Further, in response to receiving a tour stop trigger for the tour operation of Route2, the monitoring camera 1000 stops the tour operation of Route2 according to the processing of the flowchart illustrated in FIG. 6.

Figure 7B:
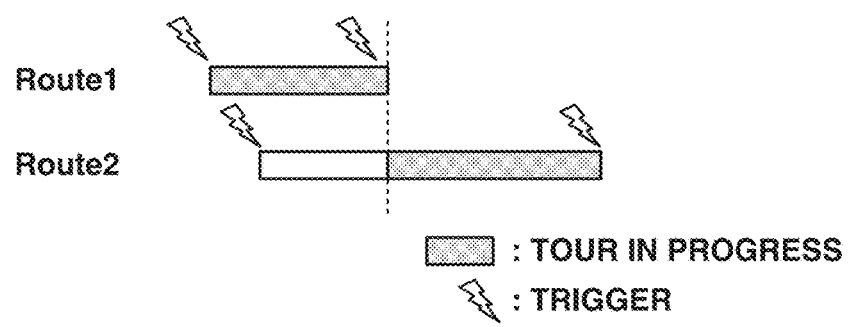
Figure 7C:
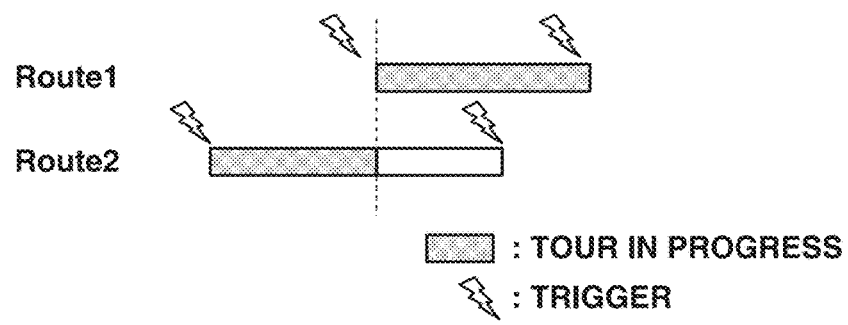
Figure 7D:
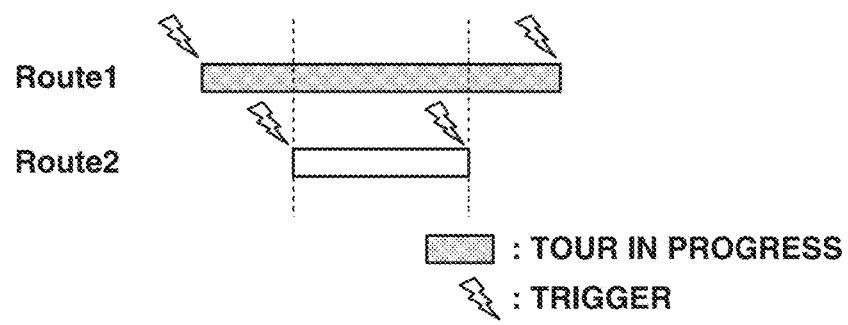

Other than the operations illustrated in FIG. 7A, in response to receiving the respective triggers at the timings illustrated in FIGS. 7B to 7D, the monitoring camera 1000 can switch between the tour operation of Route1 and the tour operation of Route2 according to the processing of the flowchart illustrated in FIG. 6.

As mentioned above, according to the first exemplary embodiments, in a case where a plurality of tour routes overlaps each other in tour period, a tour route having a smaller route number is determined to have a higher priority and the tour route to be performed is determined accordingly. Therefore, a user can register a plurality of tour routes that overlaps each other in tour period. This can further reduce the time and effort to take the priorities of the tour routes into consideration.

Although a route having a smaller number is set to have a higher priority in the above-mentioned description, the present exemplary embodiment is not limited thereto. For example, the method of assigning a higher priority to a route having a larger route number may be used. Further, the priority order may be determined based on the dictionary order of tour route names or the update order of tour route settings. Alternatively, a setting unit for allowing a user to set a desired priority order may be provided in the GUI 5000 so that the tour route to be started can be determined based on the tour route priority set via the setting unit. In the present exemplary embodiment, the tour route name corresponds to the tour route name included in the tour conditions.

In the present exemplary embodiment, the tour route switching processing illustrated in FIG. 6 is performed by the system control unit 1003. However, the system control unit 2003 may be configured to perform the tour route switching processing illustrated in FIG. 6.

In the present exemplary embodiment, the system control unit 1003 starts the processing of the flowchart illustrated in FIG. 6 in response to the start/stop trigger transmitted from the client apparatus 2000. However, the monitoring camera 1000 may be configured to store tour route information in the memory on its own and switch its operation schedule based on the stored information.

In the present exemplary embodiment, the system control unit 1003 corresponds to a priority order setting unit for setting the priority order of tour conditions.

Hereinafter, a flow of preset tour start and stop operations to be performed by the monitoring camera 1000 according to a second exemplary embodiment of the present invention will be described in detail below with reference to FIG. 8. The flowchart illustrated in FIG. 8 includes portions similar to those described in the first exemplary embodiment and therefore the redundant description thereof will be avoided. The system control unit 1003 performs the processing of the flowchart illustrated in FIG. 8.

The system control unit 1003 starts the processing of the flowchart illustrated in FIG. 8 in response to arrival of a tour start time, in response to receipt of a tour start trigger, in response to arrival of a tour end time, or in response to receipt of a tour stop trigger. Further, the system control unit 1003 starts or stops a tour operation in response to establishment of a video connection with a client, in response to disconnection of the video connection, or in response to a change made to preset tour settings via the GUI 5000 illustrated in FIG. 5.

In step S8001, the system control unit 1003 checks whether there is a tour route of which preset tour operation is currently in progress. As the check result, if there is a tour route of which preset tour operation is currently in progress (Yes in step S8001), the operation proceeds to step S8002. On the other hand, if there is no tour route of which preset tour operation is currently in progress (No in step S8001), the operation proceeds to step S8003.

In step S8002, the system control unit 1003 stops the preset tour operation in progress. Then, the operation proceeds to step S8003.

In step S8003, the system control unit 1003 checks whether there is a tour route that needs to be started. If there is a tour route that needs to be started (Yes in step S8003), the operation proceeds to step S8004. On the other hand, if there is no tour route that needs to be started (No in step S8003), the system control unit 1003 ends the processing of the flowchart illustrated in FIG. 8.

In step S8004, in a case where there is a plurality of tour routes that needs to be started, the system control unit 1003 determines a tour route having a higher priority order as the tour route to be started. More specifically, in the present exemplary embodiment, the system control unit 1003 determines a route having a shorter valid tour period as the tour route to be started. In the present exemplary embodiment, the valid tour period corresponds to the period defined by the start time and the end time in the input fields 5005 and 5006 usable to designate the time period. Then, the operation proceeds to step S8005.

In step S8005, the system control unit 1003 starts the preset tour operation of the tour route determined in step S8004.

Next, the behavior of the monitoring camera 1000 according to the present exemplary embodiment which performs the processing illustrated in FIG. 8 in a case where a plurality of preset tour operations overlaps each other in tour period will be described in detail below with reference to FIG. 9.

Figure 9:
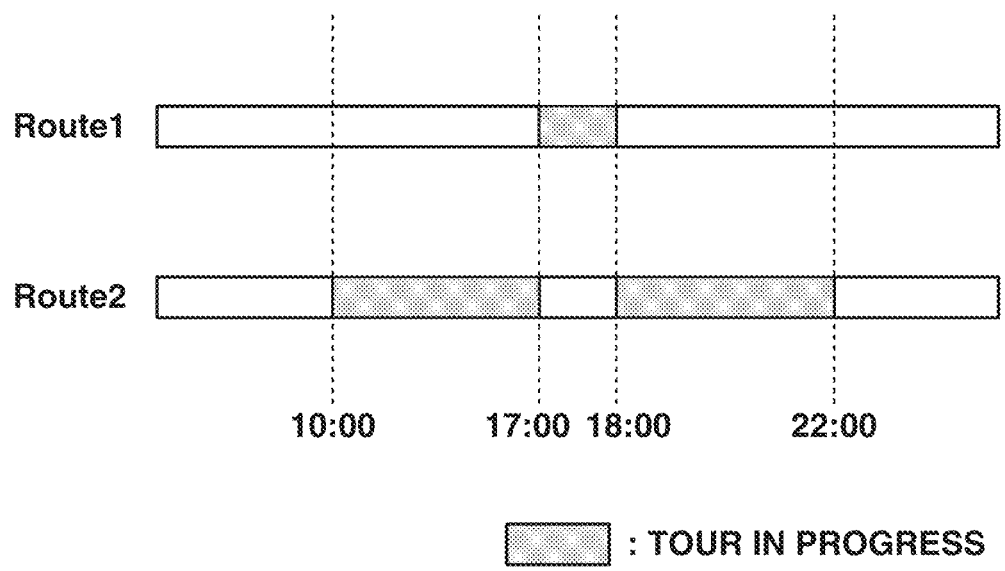
FIG. 9 illustrates an example of behavior of the monitoring camera in the preset tour operations according to the second exemplary embodiment.

In FIG. 9, the tour operation of Route1 is assumed to be the preset tour operation to be performed during the period from 17:00 to 18:00. Similarly, the tour operation of Route2 is assumed to be the preset tour operation to be performed during the period from 10:00 to 22:00. In this example, the tour operation of Route1 is shorter in valid tour period than the tour operation of Route2. Therefore, the monitoring camera 1000 preferentially performs the tour operation of Route1 according to the processing of the flowchart illustrated in FIG. 8. More specifically, the monitoring camera 1000 performs the tour operation of Route2 during the period from 10:00 to 17:00. Then, the monitoring camera 1000 performs the tour operation of Route1 during the period from 17:00 to 18:00. Then, the monitoring camera 1000 performs the tour operation of Route2 during the period from 18:00 to 22:00.

The monitoring system according to the present exemplary embodiment has a configuration that is suitable for a case where a user wants to make the monitoring camera 1000 usually perform a tour operation to uniformly monitor the entire area of a target site, and during a period (e.g., 17:00 to 18:00) in which people frequently come in and out of the site, perform a tour operation to monitor the site focusing on its entrance area. In other words, this configuration is suitable for a case where a monitoring camera, in which a route having a shorter valid tour period is set for a local tour operation in most cases, is used.

As mentioned above, according to the second exemplary embodiment, in a case where a plurality of tour routes overlaps each other in tour period, the tour route to be performed is determined based on the criterion that a route having a shorter valid tour period has a higher priority.

In the above-mentioned description, a higher priority is set for a route having a shorter valid tour period. However, the present exemplary embodiment is not limited thereto. An alternative method may be used in which the tour route to be started is determined based on, for example, the number of registered preset positions of each tour route, the time required for one cycle of each tour route, or the registered preset pause durations.

Hereinafter, a flow of preset tour start and stop operations to be performed by the monitoring camera 1000 according to a third exemplary embodiment of the present invention will be described in detail below with reference to FIG. 10. The flowchart illustrated in FIG. 10 includes portions similar to those described in the first exemplary embodiment and therefore the redundant description thereof will be avoided. The system control unit 1003 performs the processing of the flowchart illustrated in FIG. 10.

Figure 10:
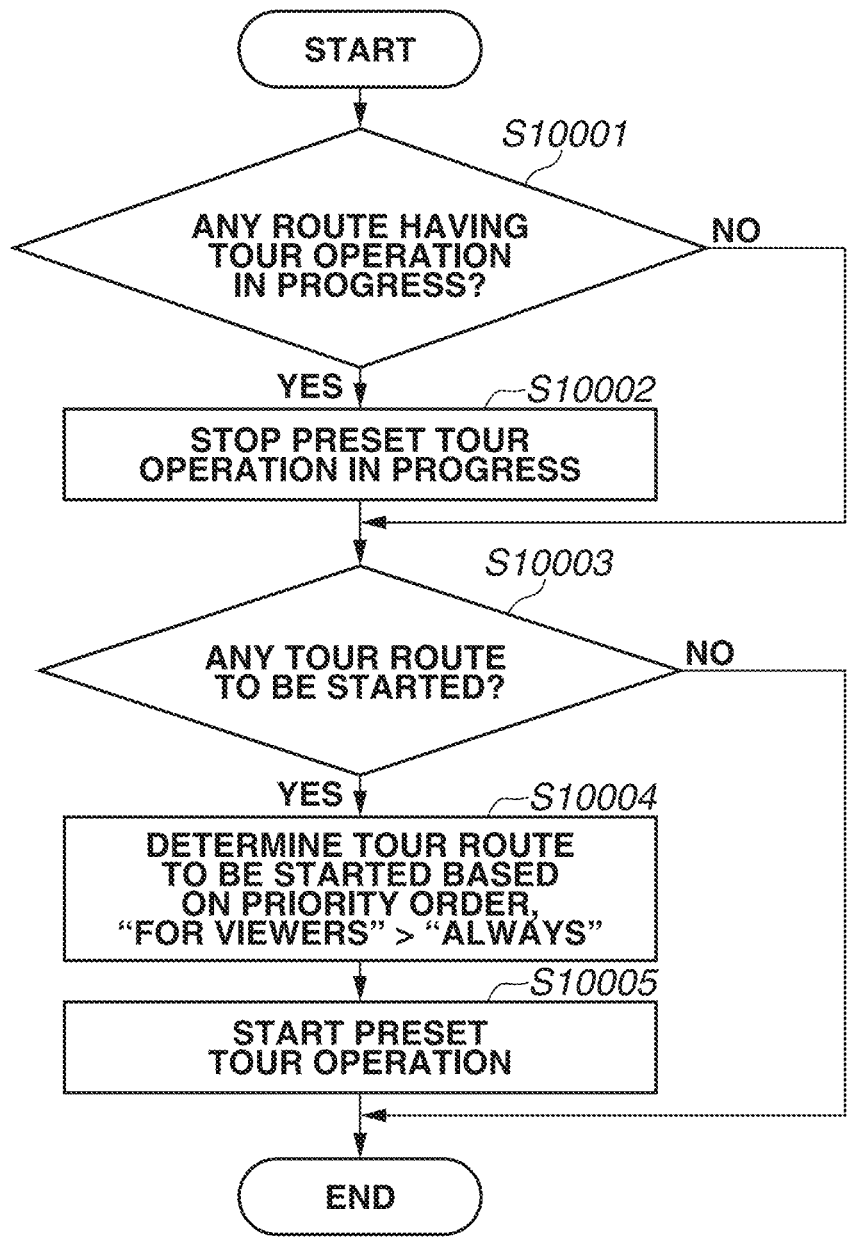
FIG. 10 is a flowchart illustrating a series of preset tour (start and stop) operations according to a third exemplary embodiment of the present invention.

The system control unit 1003 starts the processing of the flowchart illustrated in FIG. 10 in response to arrival of a tour start time, in response to reception of a tour start trigger, in response to arrival of a tour end time, or in response to reception of a tour stop trigger. Further, the system control unit 1003 starts or stops a tour operation in response to establishment of a video connection with a client, in response to disconnection of the video connection, or in response to a change made to preset tour settings via the GUI 5000 illustrated in FIG. 5.

In step S10001, the system control unit 1003 checks whether there is a tour route of which preset tour operation is currently in progress. As the check result, if there is a tour route of which preset tour operation is currently in progress (Yes in step S10001), the operation proceeds to step S10002. On the other hand, if there is no tour route of which preset tour operation is currently in progress (No in step S10001), the operation proceeds to step S10003.

In step S10002, the system control unit 1003 stops the preset tour operation in progress. Then, the operation proceeds to step S10003.

In step S10003, the system control unit 1003 checks whether there is a tour route that needs to be started. If there is a tour route that needs to be started (Yes in step S10003), the operation proceeds to step S10004. On the other hand, if there is no tour route that needs to be started (No in step S10003), the system control unit 1003 ends the processing of the flowchart illustrated in FIG. 10.

In step S10004, in a case where there is a plurality of tour routes that needs to be started, the system control unit 1003 determines a tour route having a higher priority order as the tour route to be started. More specifically, in the present exemplary embodiment, the system control unit 1003 prioritizes a tour route for which the valid condition "for viewers" is set in the input field 5003 over a tour route for which the valid condition "always" is set in the input field 5003, and determines the prioritized route as the tour route to be started.

In step S10005, the system control unit 1003 starts the preset tour operation of the tour route determined in step S10004. In the present exemplary embodiment, the valid condition used in determining the priority order corresponds to the connection state with the external apparatus. The system control unit 1003 corresponds to a determination unit for determining the connection state.

Next, the behavior of the monitoring camera 1000 according to the present exemplary embodiment which performs the processing illustrated in FIG. 10 in a case where a plurality of preset tour operations overlaps each other in tour period will be described in detail below with reference to FIG. 11.

Figure 11:
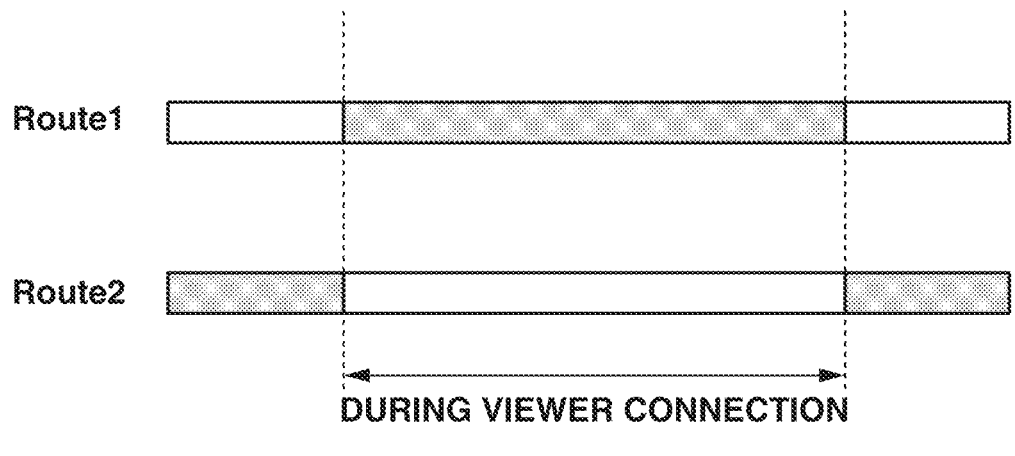
FIG. 11 illustrates an example of behavior of the monitoring camera in the preset tour operations according to the third exemplary embodiment.

In FIG. 11, the tour operation of Route1 is assumed to be the preset tour operation to be performed during viewer connection, with the valid condition "for viewers" set in the input field 5003. On the other hand, the tour operation of Route2 is assumed to be the preset tour operation to be performed during all the time, with the valid condition "always" set in the input field 5003.

In this example, the monitoring camera 1000 performs the preset tour operation of Route2 all the time since the valid condition is set to "always". On the other hand, at the timing of when the client apparatus 2000 is connected to the viewer, the monitoring camera 1000 stops the tour operation of Route2 and then starts the tour operation of Route1. Further, at the timing of when the client apparatus 2000 is disconnected from the viewer, the monitoring camera 1000 stops the tour operation of Route1 and then starts the tour operation of Route2. The above-mentioned configuration according to the present exemplary embodiment is suitable for a case where the client wants to monitor a desired tour route while browsing an image. The viewer connection in the present exemplary embodiment corresponds to the operation of receiving image data captured by the monitoring camera 1000 and displaying the image data on the display unit 2001 of the client apparatus 2000.

As mentioned above, according to the third exemplary embodiment, in a case where a plurality of tour routes overlaps each other in tour period, the valid condition in the input field 5003 in checked. Then, the tour route to be performed is determined based on the criterion that a tour route for which the valid condition "for viewers" is set in the input field 5003 has a higher priority than a tour route for which the valid condition "always" is set in the input field 5003.

In the above-mentioned description, a higher priority is set for the tour route for which the valid condition "for viewers" is set in the input field 5003, compared to the tour route for which the valid condition "always" is set in the input field 5003. However, the present exemplary embodiment is not limited thereto. For example, a user may be able to set other valid condition to which a higher priority is assigned.

Although the client apparatus 2000 according to the present exemplary embodiment switches the tour operation when performing the viewer connection. Alternatively, the client apparatus 2000 may be configured to transmit each trigger to the monitoring camera 1000 when performing the viewer connection. On the other hand, the monitoring camera 1000 may be configured to detect a viewer connection operation of the client apparatus 2000 and switch the tour operation.

In the present exemplary embodiment, although the viewer connection operation of the client apparatus 2000 is exemplified, the above-mentioned processing may also be performed in response to a viewer connection operation of another client apparatus (not illustrated) other than the client apparatus 2000.

Hereinafter, a flow of preset tour start and stop operations to be performed by the monitoring camera 1000 according to a fourth exemplary embodiment of the present invention will be described in detail below with reference to FIG. 12. The flowchart illustrated in FIG. 12 includes portions similar to those described in the first exemplary embodiment and therefore the redundant description thereof will be avoided. The system control unit 1003 performs the processing of the flowchart illustrated in FIG. 12.

Figure 12:
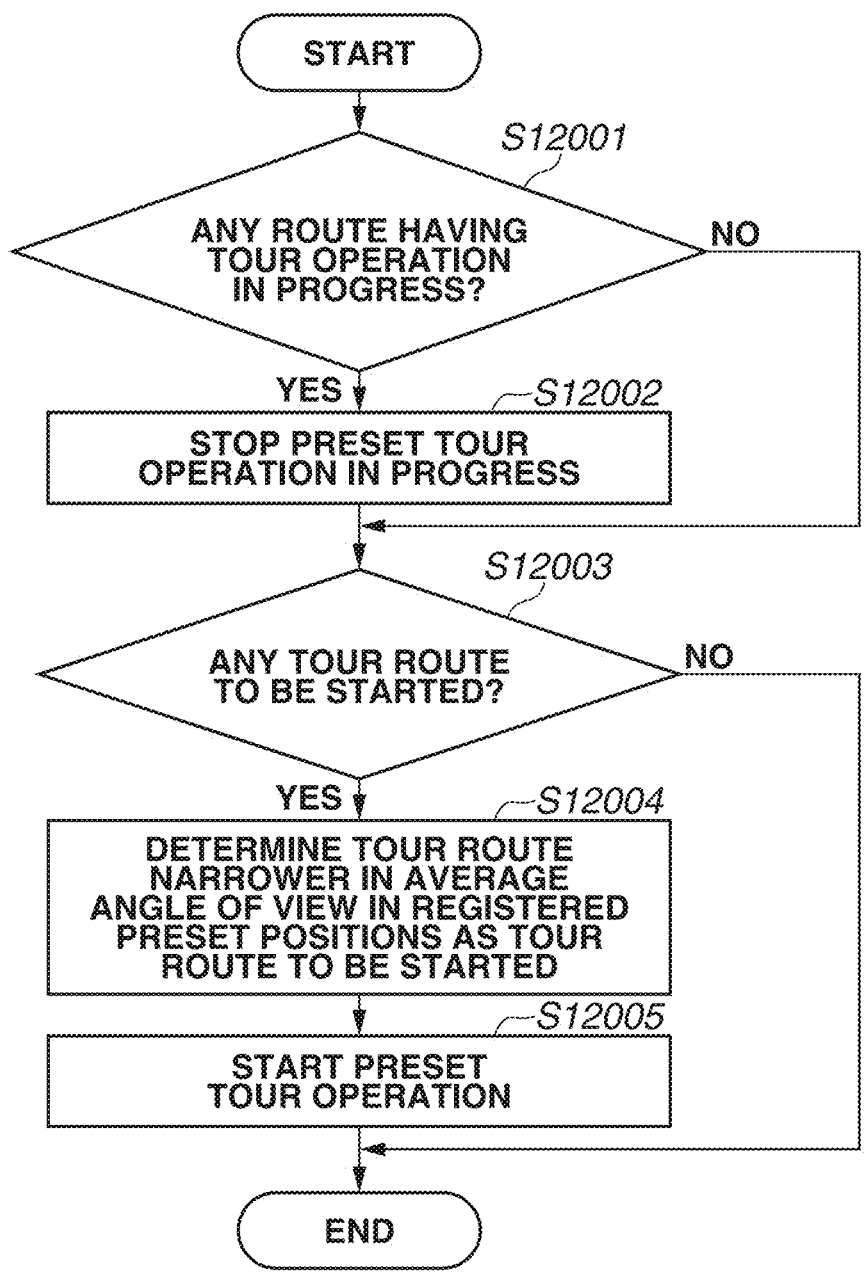
FIG. 12 is a flowchart illustrating a series of preset tour (start and stop) operations according to a fourth exemplary embodiment of the present invention.

The system control unit 1003 starts the processing of the flowchart illustrated in FIG. 12 in response to arrival of a tour start time, in response to reception of a tour start trigger, in response to arrival of a tour end time, or in response to reception of a tour stop trigger. Further, the system control unit 1003 starts or stops a tour operation in response to establishment of a video connection with a client, in response to disconnection of the video connection, or in response to a change made to preset tour settings via the GUI 5000 illustrated in FIG. 5.

In step S12001, the system control unit 1003 checks whether there is a tour route of which preset tour operation is currently in progress. As the check result, if there is a tour route of which preset tour operation is currently in progress (Yes in step S12001), the operation proceeds to step S12002. On the other hand, if there is no tour route of which preset tour operation is currently in progress (No in step S12001), the operation proceeds to step S12003.

In step S12002, the system control unit 1003 stops the preset tour operation in progress. Then, the operation proceeds to step S12003.

In step S12003, the system control unit 1003 checks whether there is a tour route that needs to be started. If there is a tour route that needs to be started (Yes in step S12003), the operation proceeds to step S12004. On the other hand, if there is no tour route that needs to be started (No in step S12003), the system control unit 1003 ends the processing of the flowchart illustrated in FIG. 12.

In step S12004, in a case where there is a plurality of tour routes that needs to be started, the system control unit 1003 determines a tour route having a higher priority order as the tour route to be started. More specifically, in the present exemplary embodiment, the system control unit 1003 prioritizes a tour route that is narrower in the average of angle-of-view values at the registered preset positions, and determines the prioritized route as the tour route to be started.

In step S12005, the system control unit 1003 starts the preset tour operation of the tour route determined in step S12004.

Here, it is considered that a tour route, in which many preset positions having narrow angle-of-view values are registered, is set for a local tour operation in most cases. It is therefore considered that monitoring a specific area intended by a user has greater importance than that of bird's-eye monitoring for monitoring the entire area. That is, the above-mentioned configuration is suitable for a case where the monitoring camera 1000 is used.

As mentioned above, according to the fourth exemplary embodiment, in a case where a plurality of tour routes overlaps each other in tour period, the tour route to be performed is determined based on the criterion that a route that is narrower in the average of angle-of-view values at the registered preset positions has a higher priority.

In the above-mentioned description, a higher priority is set for the tour route that is narrower in the average of angle-of-view values at the registered preset positions. However, the present exemplary embodiment is not limited thereto. For example, a method may be used in which a higher priority is set for the tour route that is narrower in the maximum range of angle-of-view values at the registered preset positions. Alternatively, a method may be used in which the tour route to be started is determined based on various parameter values of registered preset positions (e.g. magnitude, average, variation).

Hereinafter, a flow of tour start and stop operations to be performed by the monitoring camera 1000 according to a fifth exemplary embodiment of the present invention will be described in detail below with reference to FIG. 13. The flowchart illustrated in FIG. 13 includes portions similar to those described in the first exemplary embodiment and therefore the redundant description thereof will be avoided. The system control unit 1003 performs the processing of the flowchart illustrated in FIG. 13.

Figure 13:
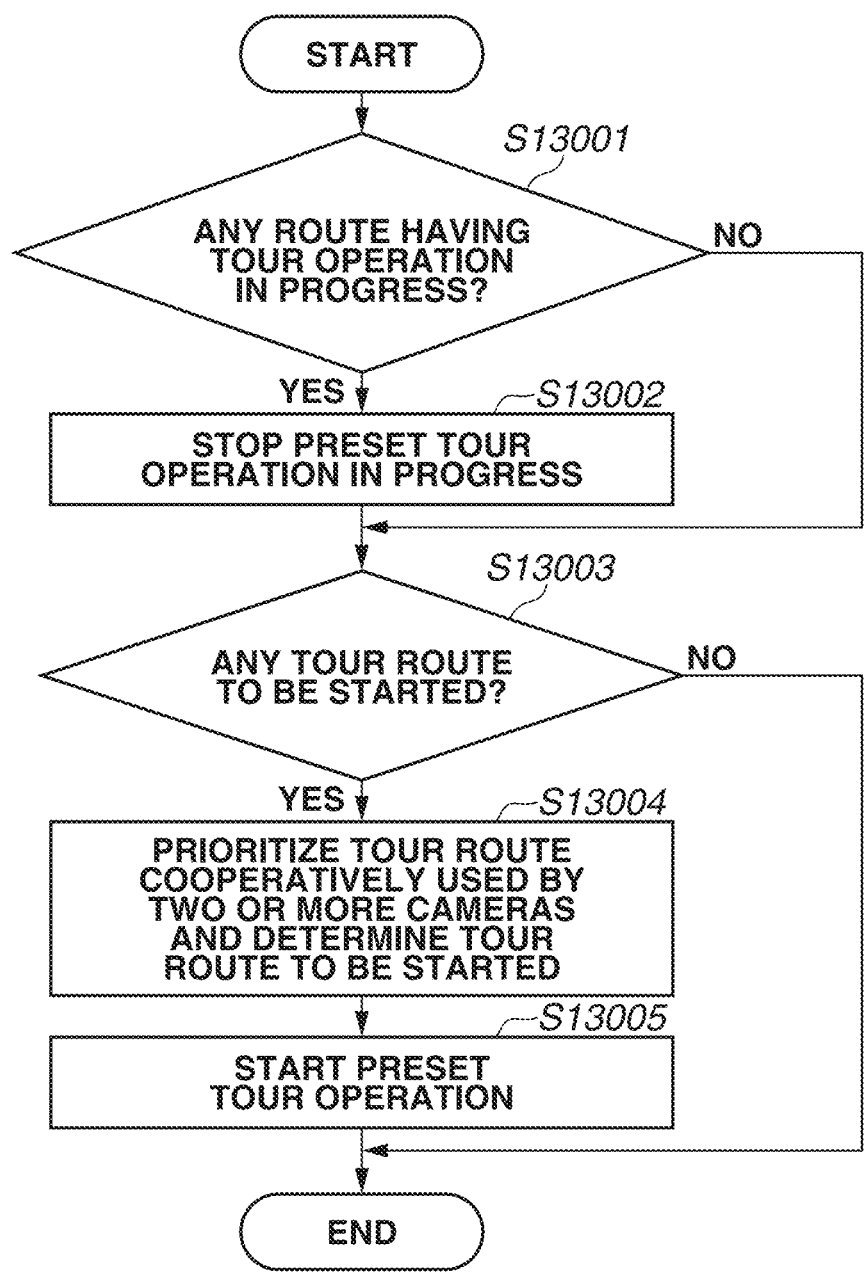
FIG. 13 is a flowchart illustrating a series of preset tour (start and stop) operations according to a fifth exemplary embodiment of the present invention.

The system control unit 1003 starts the processing of the flowchart illustrated in FIG. 13 in response to arrival of a tour start time, in response to receipt of a tour start trigger, in response to arrival of a tour end time, or in response to receipt of a tour stop trigger. Further, the system control unit 1003 starts or stops a tour operation in response to establishment of a video connection with a client, in response to disconnection of the video connection, or in response to a change made to preset tour settings via the GUI 5000 illustrated in FIG. 5.

In step S13001, the system control unit 1003 checks whether there is a tour route of which preset tour operation is currently in progress. As the check result, if there is a tour route of which preset tour operation is currently in progress (Yes in step S13001), the operation proceeds to step S13002. On the other hand, if there is no tour route of which preset tour operation is currently in progress (No in step S13001), the operation proceeds to step S13003.

In step S13002, the system control unit 1003 stops the preset tour operation in progress. Then, the operation proceeds to step S13003.

In step S13003, the system control unit 1003 checks whether there is a tour route that needs to be started. If there is a tour route that needs to be started (Yes in step S13003), the operation proceeds to step S13004. On the other hand, if there is no tour route that needs to be started (No in step S13003), the system control unit 1003 ends the processing of the flowchart illustrated in FIG. 13.

In step S13004, in a case where there is a plurality of tour routes that needs to be started, the system control unit 1003 determines a tour route having a higher priority order as the tour route to be started. More specifically, in the present exemplary embodiment, the system control unit 1003 prioritizes a tour route cooperatively used by a plurality of cameras, and determines the prioritized route as the tour route to be started. A camera cooperation according to the present exemplary embodiment corresponds to a monitoring operation in which a monitoring area is shared among a plurality of cameras and a cooperative monitoring operation is performed by the plurality of cameras.

In step S13005, the system control unit 1003 starts the preset tour operation of the tour route determined in step S13004.

The behaviors of the monitoring camera and the monitoring system according to the present exemplary embodiment in a case where a plurality of preset tour operations overlaps each other in tour period will be described in detail below with reference to FIGS. 14 and 15.

Figure 14:
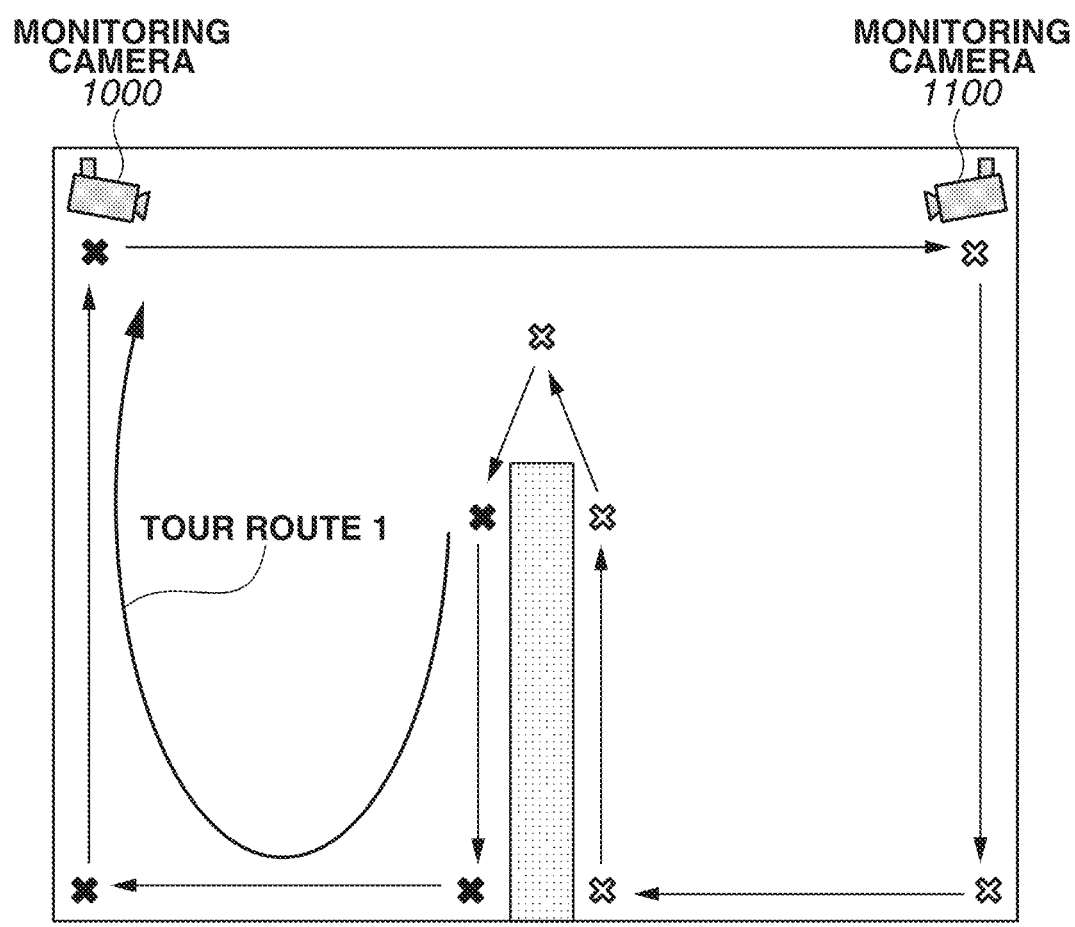
FIG. 14 illustrates an example of a preset tour operation to be cooperatively performed by a plurality of cameras according to the fifth exemplary embodiment.

FIG. 14 is a cross-sectional view illustrating a rectangular room that includes a wall positioned at the center thereof, which is an example of a monitoring target of the monitoring system according to the present exemplary embodiment. According to the example illustrated in FIG. 14, a blind spot that cannot be monitored exists due to the wall. As illustrated in FIG. 14, the monitoring camera 1000 and the monitoring camera 1100 are used to monitor the entire area of the room. In FIG. 14, the preset positions to be monitored by each of the monitoring cameras 1000 and 1100 are indicated by the corresponding cross marks.

Figure 15:
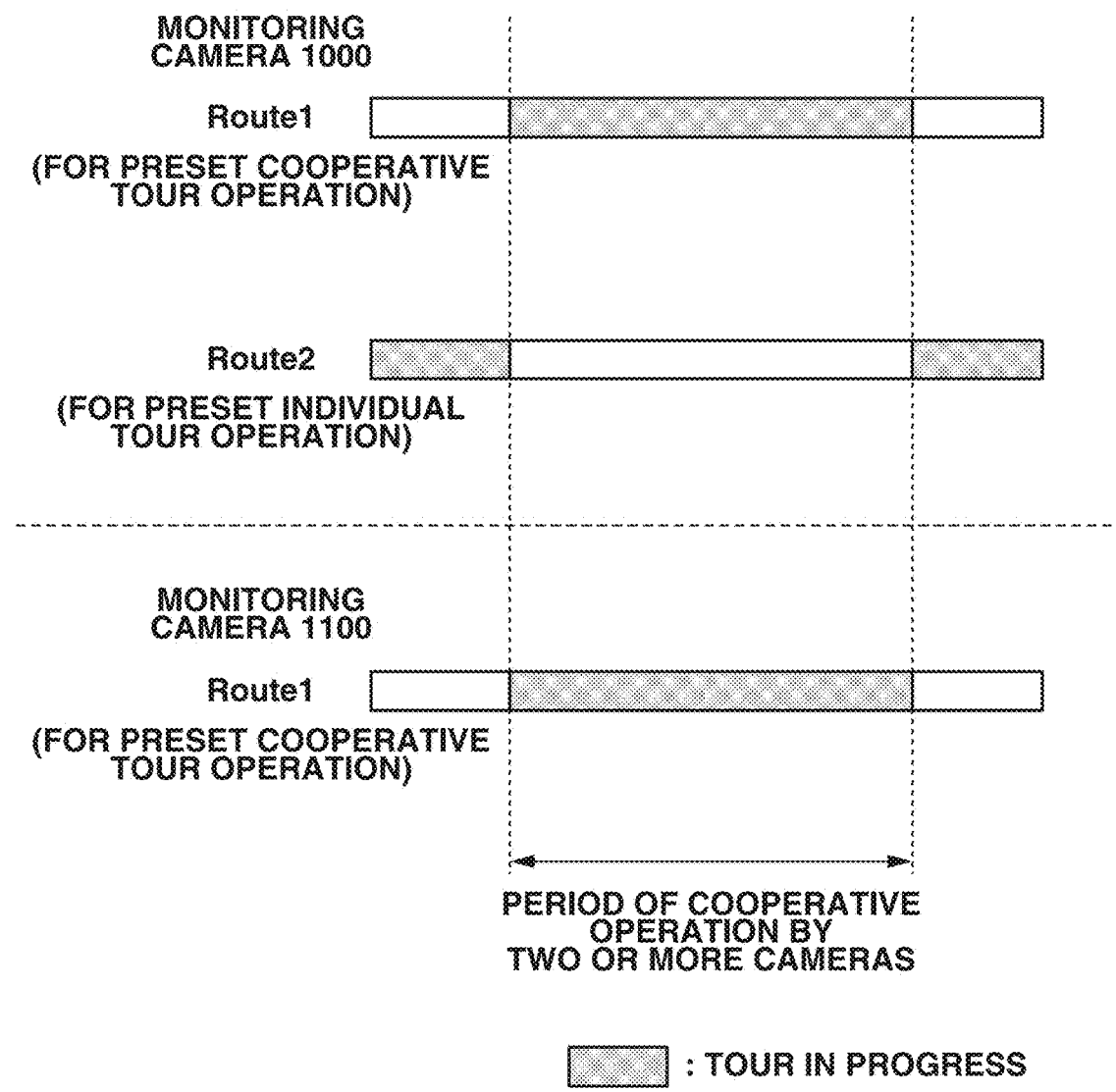
FIG. 15 illustrates an example of behavior of the monitoring camera in the preset tour operations according to the fifth exemplary embodiment.

FIG. 15 illustrates an example of preset tour operations to be performed by the monitoring cameras 1000 and 1100 illustrated in FIG. 14. The tour operation of Route1 to be performed by the monitoring cameras 1000 and 1100 illustrated in FIG. 15 is the tour operation of a cooperatively used route that corresponds to the tour route 1 illustrated in FIG. 14. The tour operation of Route2 to be performed by the monitoring camera 1000 has the valid condition "always" set in the input field 1003 so that the preset tour operation is performed all the time. In this example, the monitoring camera 1000 performs the preset tour operation of Route2 all the time since the valid condition is set to "always". At the timing of when the preset cooperative tour operation is enabled, the monitoring camera 1000 stops the tour operation of Route2 and then enables the tour operation of Route1. If the preset cooperative tour operation by the monitoring cameras 1000 and 1100 ends, the monitoring camera 1000 disables the tour operation of Route1, and starts the tour operation of Route2. The above-mentioned configuration according to present exemplary embodiment is suitable for a case where a preset tour operation is cooperatively performed by a plurality of cameras, as illustrated in FIG. 14.

As mentioned above, according to the fourth exemplary embodiment, in a case where a plurality of tour routes overlaps each other in tour period, the tour route to be performed is determined based on the criterion that a tour route, in which a preset tour operation to be cooperatively performed by a plurality of cameras is registered, has a higher priority.

In the above-mentioned description, a higher priority is set for the tour route in which a preset tour operation to be cooperatively performed by a plurality of cameras is registered. However, the present exemplary embodiment is not limited thereto. For example, a method may be used in which a priority is set for each monitoring camera and then a tour operation to be performed by the monitoring camera having a higher priority is assigned a higher priority.

Hereinafter, a flow of processing to be performed by the monitoring camera 1000 according to a sixth exemplary embodiment of the present invention will be described in detail below with reference to FIGS. 16, 17, 18, and 19. The processing is intended to, in a case where a plurality of tour routes needs to be started, the routes are compared to determine the route having a higher priority. The processing includes portions similar to those described in the first exemplary embodiment and therefore the redundant description thereof will be avoided. The system control unit 1003 performs the processing of flowcharts illustrated in FIGS. 16, 17, 18, and 19.

Figure 16:
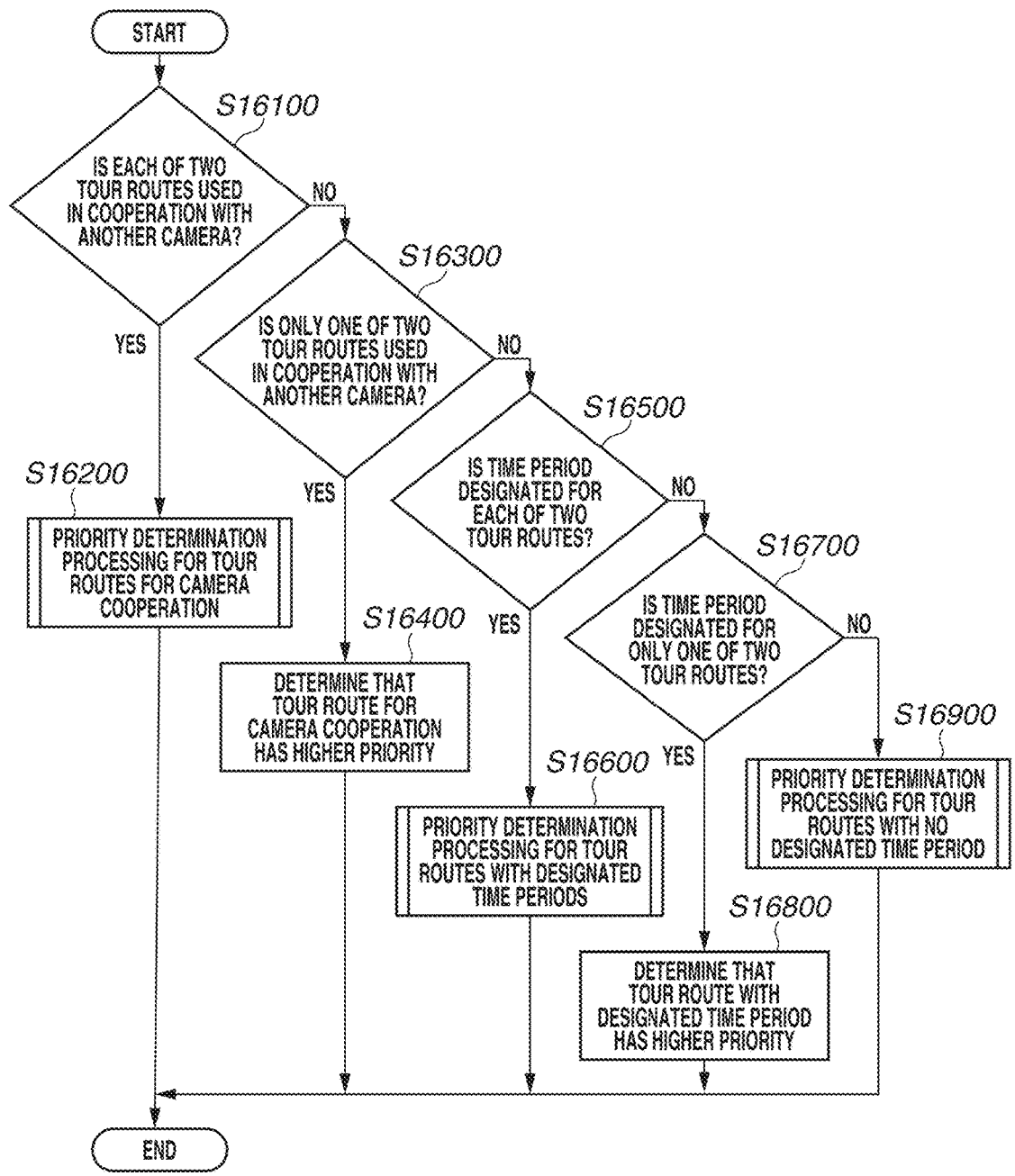
FIG. 16 is a flowchart illustrating priority determination processing for tour routes in the preset tour operations according to a sixth exemplary embodiment of the present invention.

FIG. 16 is a flowchart illustrating an example of the processing to be performed by the monitoring camera and the monitoring system according to the present exemplary embodiment. In this flowchart, two tour routes are compared to determine the route having a higher priority. The system control unit 1003 performs the processing of the flowchart illustrated in FIG. 16.

The system control unit 1003 starts the processing, and then in step S16100, the system control unit 1003 checks whether each of the two tour routes is set for a preset tour operation to be performed in cooperation with another monitoring camera. If the system control unit 1003 determines that each of the two tour routes is set for a preset tour operation to be performed in cooperation with another monitoring camera (Yes in step S16100), the operation proceeds to step S16200 to perform priority determination processing for tour routes for camera cooperation. The priority determination processing for tour routes for camera cooperation will be described in detail below with reference to FIG. 17. On the other hand, if the system control unit 1003 determines that neither or one of the two tour routes is set for a preset tour operation to be performed in cooperation with another monitoring camera (No in step S16100), the operation proceeds to step S16300.

In step S16300, the system control unit 1003 checks whether only one of the two tour routes is used for a preset tour operation to be performed in cooperation with another monitoring camera. If the system control unit 1003 determines that only one of the two tour routes is set for a preset tour operation to be performed in cooperation with another camera (Yes in step S16300), the operation proceeds to step S16400. On the other hand, if the system control unit 1003 determines that each of the two tour routes is set for a preset tour operation to be individually performed by one camera (No in step S16300), the operation proceeds to step S16500.

In step S16400, the system control unit 1003 determines that the tour route set for a preset tour operation to be performed in cooperation with another camera has a higher priority.

In step S16500, the system control unit 1003 checks whether a time period is designated for each of the two tour routes. If the system control unit 1003 determines that a time period is designated for each of the two tour routes (Yes in step S16500), the operation proceeds to step S16600 to perform priority determination processing for tour routes with designated time periods. The priority determination processing for tour routes with designated time periods will be described in detail below with reference to FIG. 18. On the other hand, if the system control unit 1003 determines that a time period is designated for neither or one of the two tour routes (No in step S16500), the operation proceeds to step S16700.

In step S16700, the system control unit 1003 checks whether a time period is designated for only one of the tour routes. If the system control unit 1003 determines that a time period is designated for only one of the tour routes (Yes in step S16700), the operation proceeds to step S16800. On the other hand, if the system control unit 1003 determines that a time period is designated for neither of the two tour routes (No in step S16700), the operation proceeds to step S16900 to perform priority determination processing for tour routes with no designated time period. The priority determination processing for routes with no designated time period will be described in detail below with reference to FIG. 19.

In step S16800, the system control unit 1003 determines that the tour route with a designated time period has a higher priority.

Figure 17:
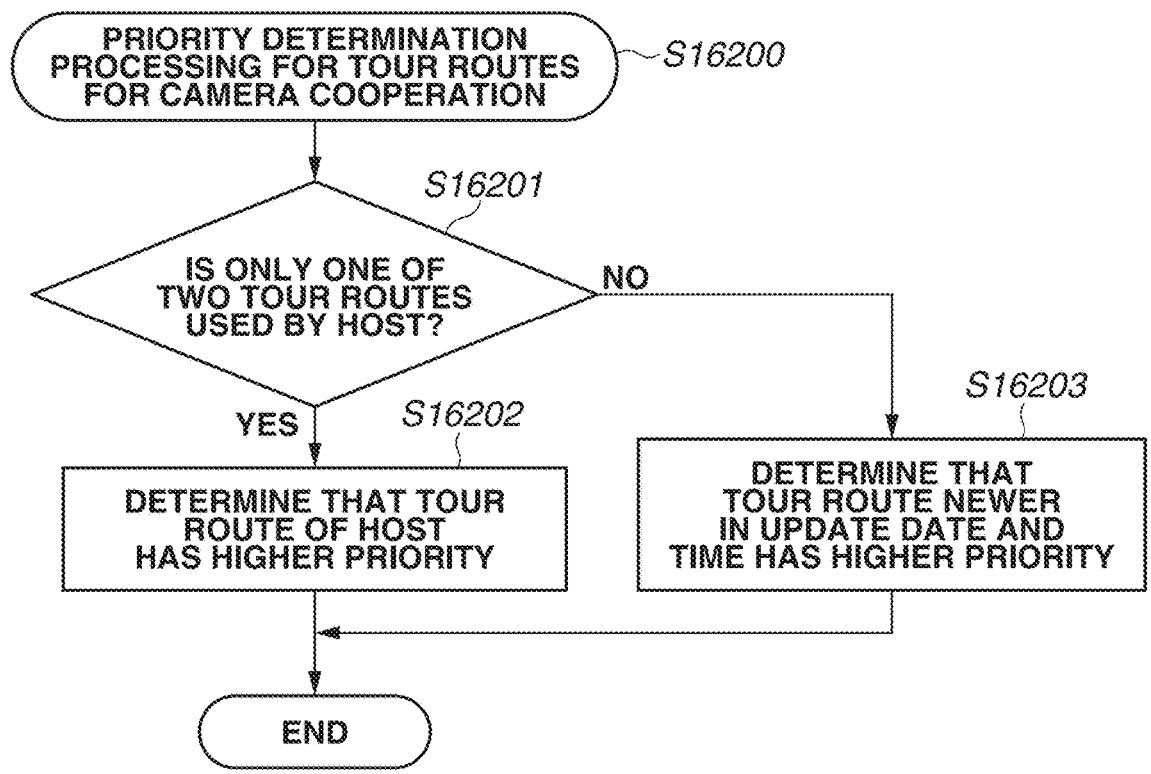
FIG. 17 is a flowchart illustrating priority determination processing for tour routes for camera cooperation in the preset tour operations according to the sixth exemplary embodiment.

FIG. 17 is a flowchart illustrating details of the priority determination processing for tour routes for camera cooperation, which is performed in step S16200 illustrated in FIG. 16. In this case, the monitoring camera in the monitoring system according to the present exemplary embodiment includes a host and a client. The host is a monitoring camera on the controlling side. The client is a monitoring camera on the controlled side. More specifically, when two monitoring cameras perform a cooperative monitoring operation, control of a camera operation of the host is prioritized over that of a camera operation of the client. In this case, a control command to be used by the host to control the client and a response to the command are communicated via the network 3000.

When the system control unit 1003 starts the priority determination processing for tour routes for camera cooperation, then in step S16201, the system control unit 1003 checks whether only one of the two tour routes to be determined is used by the host in camera cooperation. That is, the system control unit 1003 checks whether only one of the two tour routes is used by the camera on the controlling side. If the system control unit 1003 determines that only one of the two tour routes is used by the host in camera cooperation, i.e., the camera on the controlling side (Yes in step S16201), the operation proceeds to step S16202. On the other hand, if the system control unit 1003 determines that each of the two tour routes is used by the host in camera cooperation, or each of the two tour routes is used by the client in camera cooperation (No in step S16201), the operation proceeds to step S16203.

In step S16202, the system control unit 1003 determines that the tour route used by the host in camera cooperation, i.e., the camera on the controlling side, has a higher priority.

In step S16203, the system control unit 1003 determines that the tour route that is newer in update date and time (i.e., tour route setting time) has a higher priority.

Figure 18:
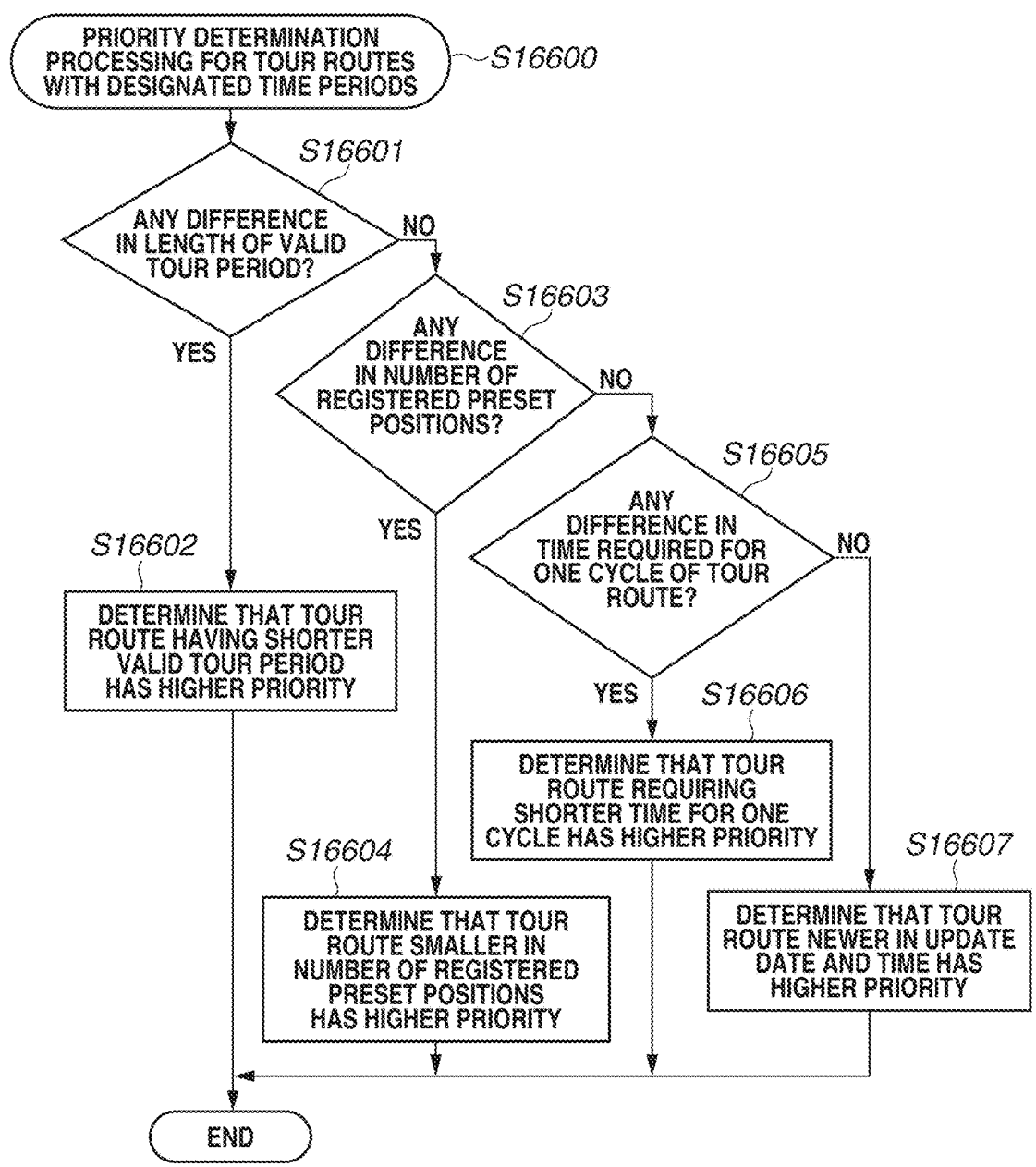
FIG. 18 is a flowchart illustrating priority determination processing for tour routes with designated time periods in the preset tour operations according to the sixth exemplary embodiment.

FIG. 18 is a flowchart illustrating details of the priority determination processing for tour routes with designated time periods, which is performed in step S16600 illustrated in FIG. 16.

In step S16601, the system control unit 1003 checks whether there is a difference in length of valid tour period between the tour routes. If the system control unit 1003 determines that there is a difference in length of valid tour period between the tour routes (Yes in step S16601), the operation proceeds to step S16602. If the system control unit 1003 determines that there is no difference in length of valid tour period between the tour routes (No in step S16601), the operation proceeds to step S16603.

In step S16602, the system control unit 1003 determines that the tour route having a shorter valid tour period has a higher priority.

In step S16603, the system control unit 1003 checks whether there is a difference in number of registered preset positions between the tour routes. If the system control unit 1003 determines that there is a difference in number of registered preset positions between the tour routes (Yes in step S16603), the operation proceeds to step S16604. If the system control unit 1003 determines that there is no difference in number of registered preset positions between the tour routes (No in step S16603), the operation proceeds to step S16605.

In step S16604, the system control unit 1003 determines that the tour route having a smaller number of registered preset positions has a higher priority.

In step S16605, the system control unit 1003 checks whether there is a difference in time required for one cycle between the tour routes. If the system control unit 1003 determines that there is a difference in time required for one cycle between the tour routes (Yes in step S16605), the operation proceeds to step S16606. If the system control unit 1003 determines that there is no difference in time required for one cycle between the tour routes (No in step S16605), the operation proceeds to step S16607.

In step S16606, the system control unit 1003 determines that the tour route requiring a shorter time for one cycle has a higher priority.

In step S16607, the system control unit 1003 determines that the tour route that is newer in update date and time has a higher priority.

Figure 19:
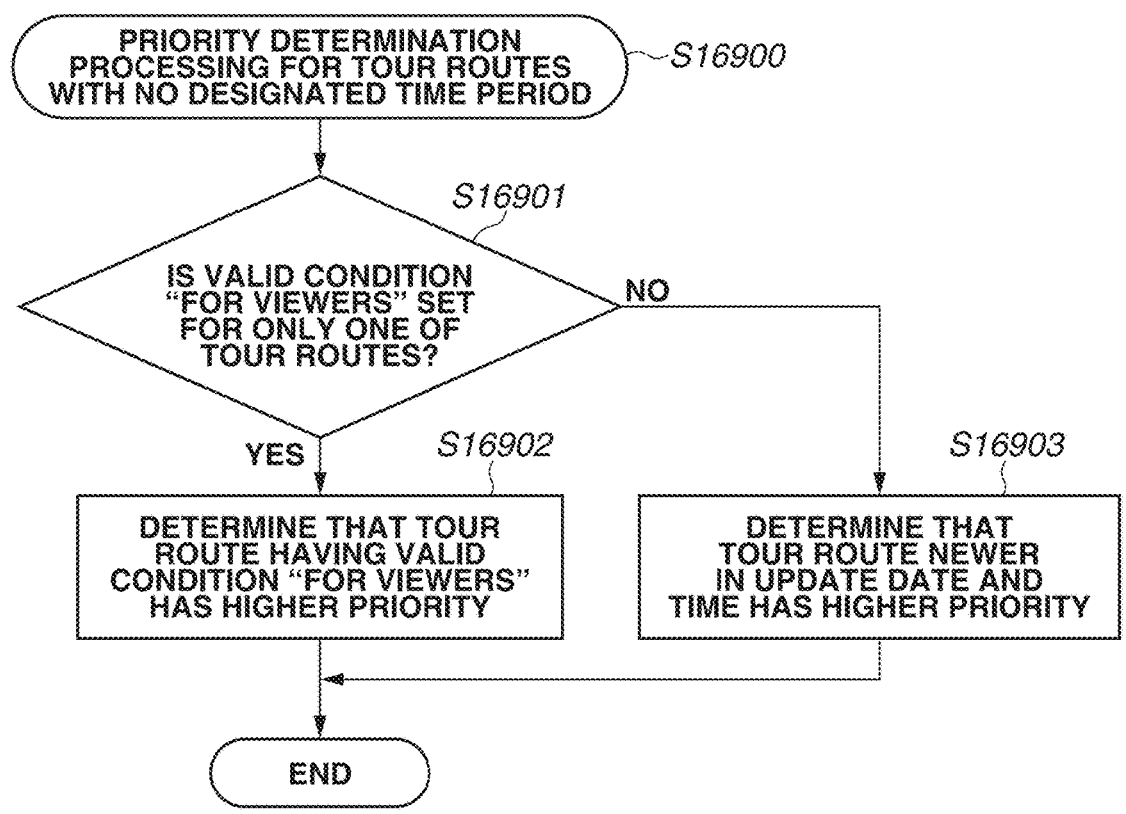
FIG. 19 is a flowchart illustrating priority determination processing for tour routes with no designated time period in the preset tour operations according to the sixth exemplary embodiment.

FIG. 19 is a flowchart illustrating details of the priority determination processing for routes with no designated time period, which is performed in step S16900 illustrated in FIG. 16.

In step S16901, the system control unit 1003 checks whether the valid condition "for viewers" is set in the input field 5003 for only one of the tour routes. If the system control unit 1003 determines that the valid condition "for viewers" is set in the input field 5003 for only one of the tour routes (Yes in step S16901), the operation proceeds to step S16902. On the other hand, if the system control unit 1003 determines that the valid condition "for viewers" is set in the input field 5003 for each of the two tour routes, or the valid condition "for viewers" is set in the input field 5003 for neither of the two tour routes (No in step S16901), the operation proceeds to step S16903.

In step S16902, the system control unit 1003 determines that the tour route for which the valid condition "for viewers" is set in the input field 5003 has a higher priority.

In step S16903, the system control unit 1003 determines that the tour route that is newer in update date and time has a higher priority.

In the above-mentioned method, two tour routes are compared to determine the route having a higher priority, assuming the case where a plurality of tour routes overlaps each other in a plurality of conditions. However, the present exemplary embodiment is not limited thereto. The order of processes in the priority determination may be changed. Alternatively, a modified determination criterion may be used.

Further, in a case where there are three or more registered tour routes that overlap one another in tour period, the tour route having the highest priority may be determined by repeating the method of comparing two of the tour routes and determining the tour route having a higher priority.

Further, a setting unit may be provided in the GUI 5000 so that a user can assign a desired priority order to each condition.

Examples of processing to be performed by the monitoring camera according to the present exemplary embodiment in a case where a plurality of preset tour operations overlaps each other in tour period will be described in detail below. Each monitoring camera has a configuration similar to that of the monitoring camera 1000 illustrated in FIG. 1 and therefore the redundant description thereof will be avoided.

A first example of the processing to be performed by the monitoring camera according to the present exemplary embodiment in a case where a plurality of preset tour operations overlaps each other in tour period will be described in detail below with reference to FIGS. 20 and 21.

Figure 20:
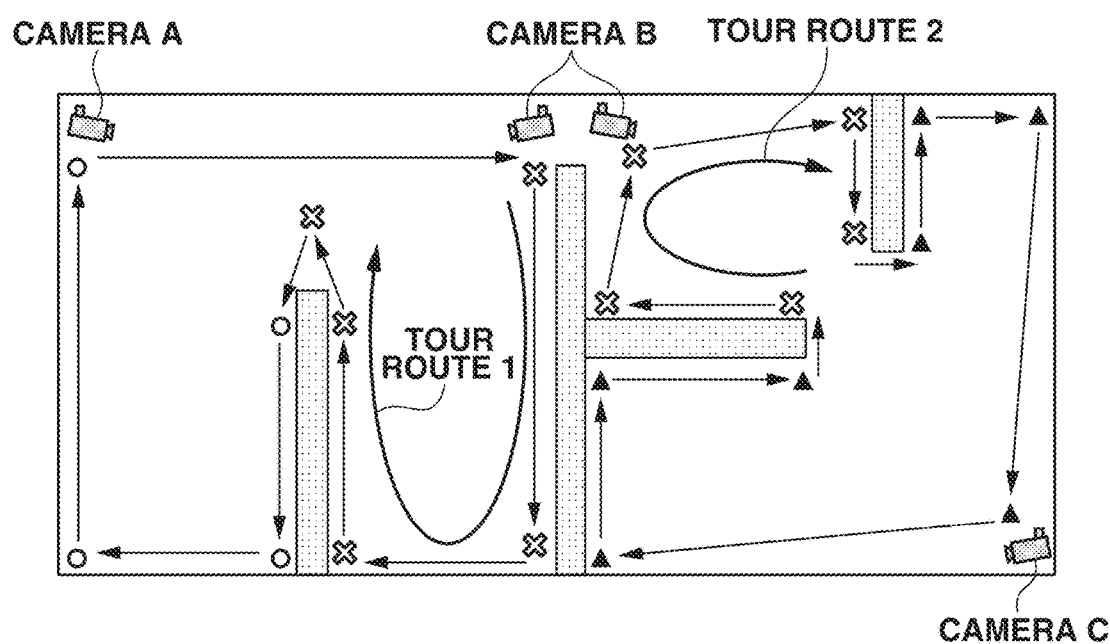
FIG. 20 illustrates an example of preset tour operations to be cooperatively performed by a plurality of cameras according to the sixth exemplary embodiment.

FIG. 20 illustrates an example of preset tour operations to be performed by three monitoring cameras installed in a room. It is assumed here that two tour routes registered for a monitoring camera B overlap each other in tour period. A tour route 1 is set for a preset tour operation to be cooperatively performed by the monitoring camera B and a monitoring camera A, which is the tour route of Route1 illustrated in FIG. 21. A tour route 2 is set for a preset tour operation to be cooperatively performed by the monitoring camera B and a monitoring camera C, which is the tour route of Route2 illustrated in FIG. 21.

FIG. 21 illustrates settings for the respective tour routes of the monitoring camera B. In the tour operation of Route1, the monitoring camera A serves as the host and the monitoring camera B serves as the client. On the other hand, in the tour operation of Route2, the monitoring camera B serves as the host and the monitoring camera C serves as the client. The two tour periods partly overlap each other.

In the time period in which the two tour routes overlap each other, the monitoring camera B according to the present exemplary embodiment performs the processing of the flowchart illustrated in FIG. 16 to determine the priority order of the tour routes.

More specifically, the priority of the tour route of Route1 and the priority of the tour route of Route2 are compared. Each of the tour route of Route1 and the tour route of Route2 is a tour route for camera cooperation. Therefore, the priority determination processing for tour routes for camera cooperation illustrated in FIG. 17 is performed. Further, the camera B serves as the client in the tour operation of Route1 and serves as the host in the tour operation of Route2. Therefore, the tour route of Route2 is determined to have a higher priority.

Further, a second example of the processing to be performed by the monitoring camera according to the present exemplary embodiment in a case where a plurality of preset tour operations overlaps each other in tour period will be described in detail below with reference to FIGS. 22 and 23.

Figure 22:
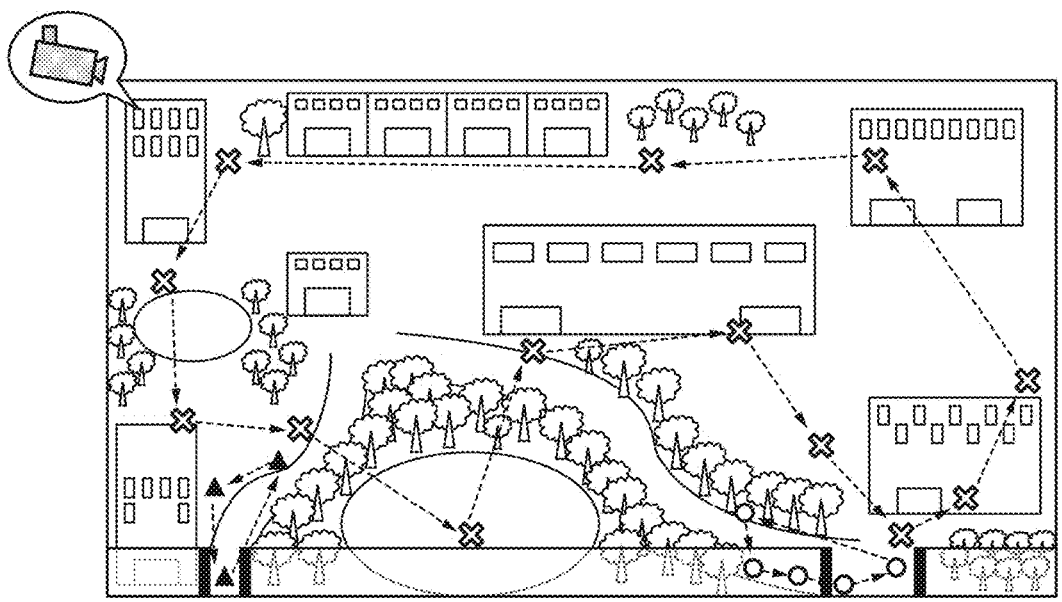
FIG. 22 illustrates examples of tour routes in the preset tour operations according to the sixth exemplary embodiment.

FIG. 22 illustrates an example of preset tour operations to be performed by a single monitoring camera installed on a target site. Each of three preset tour routes is indicated by the marks corresponding thereto.

FIG. 23 illustrates setting information of the three registered tour routes 1 to 3. The priority of the tour route of Route1 and the priority of the tour route of Route2 are compared. Each of the tour route of Route1 and the tour route of Route2 is set for the single camera. Since a time period is designated for each of them, the priorities are compared by performing the priority determination processing for tour routes with designated time periods. The tour period of the tour route of Route1 is from 8:00 to 20:00. The tour period of the tour route of Route2 is from 17:00 to 18:00. Therefore, there is a different in length of valid tour period. The tour route of Route2 has a shorter valid tour period. Therefore, the tour route of Route2 is determined to have a higher priority. Similarly, through the priority determination processing for tour routes with designated time periods, the priority of the tour route of Route1 and the priority of the tour route of Route3 are compared. Further, the priority of the tour route of Route2 and the priority of the tour route of Route3 are compared. Through the above processing, the priority of each tour route can be determined.

Further, if no time period is designated, the priority determination processing for tour routes with no designated time period is performed to determine the priority.

The settings for the respective tour routes illustrated in FIGS. 21 and 23 include cooperation information regarding a cooperative operation. As illustrated in each of FIGS. 21 and 23, the cooperation information includes the presence or absence of a cooperative operation, and the master and slave information indicating whether to operate as the host or the client in a case where a plurality of monitoring cameras performs a cooperative operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-220844, filed Oct. 29, 2014, which is hereby incorporated by reference herein in its entirety.

What is claimed is:

1. A camera for changing at least one of an imaging direction and an imaging angle of view comprising:
    a processor; and
    a memory coupled to the processor storing instructions that, when executed by the processor, cause the processor to perform operations comprising:
    controlling at least one of the imaging direction and the imaging angle of view based on one of a plurality of tour conditions stored in a memory, the plurality of tour conditions including a plurality of preset positions, each of the preset positions including periods and tour orders of preset positions indicating imaging directions; and
    setting a tour condition with higher priority to be performed for a period, selected from the plurality of tour conditions for the camera,
    for the period when the plurality of tour conditions overlaps.

2. The camera according to claim 1,
    wherein each of the plurality of tour conditions further includes at least one of a tour moving speed at each of imaging positions, start times at each of the imaging positions, and an imaging condition,
    wherein the imaging condition includes at least one of a gain condition, a gamma condition, a dynamic range condition, an exposure condition, and a focus condition, which are to be set.

3. The camera according to claim 1, wherein each of the tour conditions includes at least one of an indication as to which apparatus is to be selected from among a plurality of apparatuses, and a monitoring position.

4. The camera according to claim 1, wherein an external apparatus communicates with the processor via a network,
    wherein the plurality of tour conditions is acquired from the external apparatus.

5. The camera according to claim 4,
    wherein a state of connection is discriminated with the external apparatus, and
    wherein, based on the discriminate connection state, the tour condition is set to be performed.

6. The camera according to claim 5, wherein the connection state includes an operating state of the external apparatus.

7. The camera according to claim 1,
    wherein the plurality of tour conditions in order are set, and
    wherein, based on the order in the plurality of tour conditions, the tour condition is set to be performed.

8. The camera according to claim 1,
    wherein each of the plurality of tour conditions further includes a setting time, and
    wherein, based on the setting time, the tour condition is set to be performed.

9. The camera according to claim 1,
    wherein each of the plurality of tour conditions further includes a tour name, and
    wherein, based on the tour name, the tour condition is set to be performed.

10. The camera according to claim 1, wherein the tour condition is set to be performed, based on a total number of the imaging positions included in each of the tour conditions.

11. The camera according to claim 1,
    wherein each of the plurality of tour conditions further includes cooperation information regarding a cooperative operation with another apparatus, and
    wherein, based on the cooperation information, the tour condition is set to be performed.

12. The camera according to claim 11, wherein the cooperation information includes at least one of information indicating presence or absence of the cooperative operation with the other apparatus, and information indicating a master and slave relationship in the cooperative operation.

13. A method for controlling a camera for changing at least one of an imaging direction and an imaging angle of view at which the camera performs an imaging operation that includes the method comprising:
    controlling the at least one of the imaging direction and the imaging angle of view based on one of a plurality of tour conditions stored in a memory, the plurality of tour conditions including a plurality of preset positions, each of the preset positions including period and tour orders of preset positions indicating imaging directions; and setting a tour condition with higher priority to be performed for a period, selected from the plurality of tour conditions for the camera, for the period when the plurality of tour conditions overlaps.

14. The method according to claim 13, further comprising:

communicating with an external apparatus via a network; and using the communicating to acquire the plurality of tour conditions from the external apparatus.

15. The method according to claim 13, further comprising:

setting the plurality of tour conditions in order; and setting, based on the order in which the setting sets the plurality of tour conditions, the tour condition to be performed.

16. The camera according to claim 1, wherein the plurality of tour conditions are switched among, based on timing of receiving a trigger signal from a client.

17. The method according to claim 13, wherein each of the plurality of tour conditions further includes at least one of a tour moving speed at each of imaging positions, start times at each of the imaging positions, and an imaging condition, wherein the imaging condition includes at least one of a gain condition, a gamma condition, a dynamic range condition, an exposure condition, and a focus condition, which are to be set.

18. The method according to claim 13, wherein each of the tour conditions includes at least one of an indication as to which apparatus is to be selected from among a plurality of apparatuses, and a monitoring position.

* * * * *